United States Patent
Bean et al.

(10) Patent No.: US 7,251,747 B1
(45) Date of Patent: Jul. 31, 2007

(54) METHOD AND SYSTEM FOR TRANSFERRING DATA USING A VOLATILE DATA TRANSFER MECHANISM SUCH AS A PIPE

(75) Inventors: Thomas A. Bean, West Columbia, SC (US); Robert A. Heath, Columbia, SC (US)

(73) Assignee: NCR Corp., Dayton, OH (US)

( * ) Notice: Subject to any disclaimer, the term of this patent is extended or adjusted under 35 U.S.C. 154(b) by 695 days.

(21) Appl. No.: 10/247,688

(22) Filed: Sep. 19, 2002

Related U.S. Application Data

(60) Provisional application No. 60/323,786, filed on Sep. 20, 2001.

(51) Int. Cl.
*G06F 11/00* (2006.01)

(52) U.S. Cl. ............... 714/18; 714/4; 714/15; 714/20; 714/732

(58) Field of Classification Search ............ 714/4, 714/15, 18, 20, 732
See application file for complete search history.

(56) References Cited

U.S. PATENT DOCUMENTS

| | | | |
|---|---|---|---|
| 5,379,418 A * | 1/1995 | Shimazaki et al. | 714/11 |
| 5,968,134 A | 10/1999 | Putzolu et al. | |
| 6,035,307 A | 3/2000 | Martin et al. | |
| 6,044,394 A | 3/2000 | Cadden et al. | |
| 6,115,781 A | 9/2000 | Howard | |
| 6,161,097 A | 12/2000 | Glass et al. | |
| 6,715,099 B1 * | 3/2004 | Smith | 714/4 |
| 6,823,336 B1 * | 11/2004 | Srinivasan et al. | 707/8 |
| 2003/0140272 A1 * | 7/2003 | Lawrance et al. | 714/13 |

OTHER PUBLICATIONS

*Platform SDK: Interprocess Communications, Transactions on Named Pipes,* http://msdn.microsoft.com/library/default.asp?url=/library/en-us/ipc/base/transactions_on_named_pipes.asp, Microsoft Corp., 2002.
*TeraBuilder™ Reference 02.00.00,* B035-2436-060A, NCR Corp., Jun. 2000.
*TeraBuilder™ Operators Reference, TeraBuilder 02.00.01.B035-2433-090A,* NCR Corp. Corp., Sep. 2000.
*Platform SDK: Interprocess Communications, Named Pipes,* http://msdn.microsoft.com/library/default.asp?url=/library/en-us/ipc/base/named_pipes.asp, Microsoft Corp., 2000.

* cited by examiner

*Primary Examiner*—Robert W Beausoliel
*Assistant Examiner*—Joseph D Manoskey
(74) *Attorney, Agent, or Firm*—Dinsmore & Shohl LLP

(57) ABSTRACT

Methods and systems for efficient and accurate re-starting of data transfers using volatile data transfer mechanisms, such as pipes, following an error. According to one embodiment, portions of the transferred data can be saved in a fallback file. In addition, checkpoint commands can be periodically provided, upon which much of the data in the fallback file can be overwritten. During the original transmission, the data that has passed through the mechanism can be counted, and a signature for the data that has passed can be accumulated. After certain error conditions, the data in the fallback file can be recovered and passed to the receiving process and the transmission can then be resumed at the point where it had left off. After other errors requiring a complete re-start, a second signature of the re-transmitted data can be accumulated and original and second signatures compared to determine if the data is valid.

18 Claims, 8 Drawing Sheets

UNIX NAMED PIPES ACCESS MODULE SOFTWARE ENVIRONMENT
WITH CLASSIC UTILITIES

WIN32 NAMED PIPES ACCESS MODULE SOFTWARE ENVIRONMENT WITH CLASSIC UTILITIES

UNIX NAMED PIPES ACCESS MODULE IN TERABUILDER INFRASTRUCTURE

METHOD AND SYSTEM FOR TRANSFERRING DATA USING A VOLATILE DATA TRANSFER MECHANISM SUCH AS A PIPE

CROSS-REFERENCE TO RELATED APPLICATION

This application claims the benefit of U.S. Provisional Application No. 60/323,786, filed Sep. 20, 2001, the entire disclosure of which is hereby incorporated herein by reference.

TECHNICAL FIELD

The present invention relates generally to the restarting of a data transfer following a data transfer error, and, more specifically, in one embodiment, to monitoring and/or saving data which is transferred using a pipe so that the data transfer process can be efficiently and accurately restarted in the event of failure.

BACKGROUND OF THE INVENTION

Computer systems have been utilized to gather, store, transfer, and analyze data obtained from a variety of sources. Such data can represent financial and commercial information, scientific information, sales transactions, customer and personnel information, internet activity, or any of a variety of information regarding activities, people, parameters, or events.

In this regard, relational database management systems (RDBMS) have been developed which allow users to access, store, and operate on data using a computer language. For example, the TERADATA RDBMS system developed by NCR Corporation provides a single data store for any number of client architectures. Such a shared information architecture eliminates the need for maintaining duplicate databases on multiple platforms. For example, this system could allow mainframe clients, workstations, and personal computers to access and manipulate the same database simultaneously. One of many ways to put data into such a data store is to use a load utility, such as FASTLOAD, MULTILOAD, or TPUMP load utiliztes. Structured Query Language (SQL) can then be used to access the data store and to query and/or manipulate the data therein. Large amounts of data can be stored or "warehoused" using such a system.

In transferring data from the various sources to the data store, a number of methods can be utilized. For instance, a process could access the source data and transfer the desired data to a file. Once all of the desired data is transferred, the file could be closed and a second process could then open the file and load the data into the data store. However, such a system can suffer from inefficiencies in transfer speed as the file must be closed by the first process before it can be accessed by the second process. Moreover, such systems are limited by file size and disk storage restrictions.

Accordingly, for data warehousing as well as for many other data transfer applications, it is often desirable to utilize more efficient data transfer mechanisms, such as those which operate using volatile mechanisms for transferring the data. One such volatile data transfer mechanism is known as a "pipe." Pipes are areas of shared memory set aside for data transfer and can be used as an efficient conduit of data from one process to another process. Pipes speed the data transfer function because multiple processes can access the pipe concurrently. Such pipe conduits are available in both the UNIX and WINDOWS operating system, and are available as "named pipes" (where the pipe has a name that is accessible by any other operating process that knows the name) and as "unnamed pipes" (where the pipe is given a private identification number used only by two processes).

However, if there is an error in transferring data via pipes, the user typically is forced to restart the data transfer process from the beginning. In other words, mid-transfer restart capability is conventionally not permitted with pipes due to their volatile nature. Once data is read from a pipe to a second process, it is removed from the pipe and if there is an error in loading that data from the second process or any other power or transfer error, the entire transfer has to start again from the beginning, thereby introducing inefficiencies due to the redundancy in retransmitting data. Some transfers can take hours or days, causing valuable time to be lost when the entire transfer must be carried out again.

Accordingly, methods and systems are desired which allow for transfer of data from a first process to a second process using pipes but which do not require data to be re-transmitted over the pipe if an error or failure is encountered. At least one embodiment described herein relates to such methods and systems.

Furthermore, after some data transfer failures, it may not be possible to resume the transfer of the data without starting again from the beginning. Yet, as can be understood, simply re-transferring the data from the first process through the pipe and to the second process does not ensure that the data being re-transferred is actually the same data which had been transferred previously. Accordingly, corrupted or erroneous data might be transferred through the pipe when re-starting the process from the beginning. Moreover, it would be redundant for the second process to operate on this data again if it had already done so during the original transfer. Accordingly, methods and systems are also desired which allow the re-transferred data from the first process to be validated against data which had already passed through the pipe and been received by the second process prior to the failure. Thus, assurance can be provided that the data being re-transferred is correct and valid as compared with the data that had already been transferred. If the data is verified as correct, the second process need not operate on that data again, thereby providing efficiency. At least one embodiment described herein relates to such methods and systems.

SUMMARY OF THE INVENTION

It is an object of at least one embodiment of the present invention to obviate one or more of the above-described described problems regarding data transfer failures.

An object of at least one embodiment of the present invention is to provide for more efficient transfer of data following a data transfer failure in systems using volatile mechanisms such as pipes for transferring data.

Moreover, an object of at least one embodiment of the present invention is to provide for more accurate transfer of data following a data transfer failure in systems using volatile mechanisms such as pipes for transferring data.

The above objects are provided merely as examples, and are not limiting nor do they define the present invention or necessarily apply to every aspect thereof. Additional objects, advantages and other novel features of the invention will be set forth in part in the description that follows and will also become apparent to those skilled in the art upon consideration of the teachings of the invention.

According to one aspect of the present invention, a computerized method for protecting data transferred using a pipe is provided. The method comprises transmitting data using a pipe to a data warehouse loading process, accessing the data being transferred via the data pipe, and saving the accessed data into a fallback file. The method further comprises transmitting additional data using the pipe to the data warehouse loading process, and periodically providing a checkpoint signal. In response to the checkpoint signal, the additional data is saved over any data remaining in the fallback file.

In accordance with another aspect of the invention, a method of validating data re-transmitted after a data transmission error using a volatile data transfer mechanism is provided. The method comprises transmitting data via a volatile data transfer mechanism and accumulating a signature of the data transmitted. In response to an error condition, data is re-transmitted via the volatile data transfer mechanism and a signature is accumulated for the re-transmitted data. The method further comprises comparing the two signatures, and, if the signatures do not match, providing an error signal.

According to another aspect of the present invention, a computer system is provided for transferring data from a source database to a target database. The system comprises a source database, and a writing process configured to extract data from the source database. The system further comprises a loading process configured to load data from the writing process to a target database, and a pipe configured to transfer data from the writing process to the loading process. In addition, the system comprises a fallback data file, and an access module configured to access data from the pipe and save data to the fallback data file for use in data recovery in the event of an error condition.

In accordance with another aspect of the present invention, a computer readable medium is provided having stored thereon a method for transferring data using a volatile data transfer mechanism and for restarting the transfer process after a failure. The method comprises transmitting data using a volatile data transfer mechanism, and accessing the data being transferred via the volatile data transfer mechanism. The method further comprises saving information relating to the accessed data, and, in response to an error condition, using the information to restart transmission of data using the volatile data transfer mechanism. The volatile data transfer mechanism can comprise a pipe, such as a named pipe for example, and can connect a first sending process with a second receiving process. The information saved can comprise a copy of the data transmitted, a count of the data transmitted, and/or a signature of the data transmitted. If the error condition allows for a resuming of the data transmission at the point it left off, the copy of the data transmitted can be used to supplement any data not successfully utilized by the receiving process. If the error condition does not allow for resuming of the data transmission at the point it left off, the signature can be used to validate any data re-transmitted following the error, and the count can be used to indicate to the receiving process which data has previously been transmitted and which data has not been previously transmitted.

Still other objects, advantages, and aspects of various embodiments will become apparent to those skilled in this art from the following description wherein there is shown and described various embodiments of this invention simply for the purposes of illustration. As will be realized, the invention is capable of other different aspects and embodiments without departing from the scope of the invention. Accordingly, the objects, advantages, drawings, descriptions, and abstract are to be regarded as illustrative in nature and not restrictive in nature.

BRIEF DESCRIPTION OF THE DRAWINGS

While the specification concludes with claims particularly pointing out and distinctly claiming the invention, it is believed that the same will be better understood from the following description of exemplary embodiments taken in conjunction with the accompanying drawings in which like reference numerals indicate corresponding structure throughout the figures.

DETAILED DESCRIPTION OF ILLUSTRATIVE EMBODIMENTS

In general, the present invention relates to efficient and accurate re-starting of data transfers using volatile data transfer mechanisms, such as pipes, following an error during the original transmission. According to one embodiment, portions of the data can be saved in a fallback file during the original data transmission, for use in recovering data if needed after an error. In addition, checkpoint commands can be periodically provided by the receiving process, at which point much of the data in the fallback file can be overwritten, thereby reducing the size of the file needed.

Moreover, during this original data transmission, the amount of data that has passed through the mechanism can be counted, and a signature for the data that has passed can be accumulated. After certain error conditions on the receiving side, the data in the fallback file can be passed to the receiving process and the transmission can then be resumed at the point where it had left off. After other errors, it may not be possible to restart the transmission from the point it had left off. In such a situation, data can be re-transmitted over the pipe, and a second signature of the re-transmitted data can be accumulated until the count has been reached. For efficiency, such data need not be operated on by the receiving process. The original signature and the second signature can then be compared and if they do not match, an error can be reported. After the amount of data re-transmitted is equal to the count size, the transmission can continue with additional data which is operated on by the receiving process. Embodiments of the invention can apply to data warehousing systems where a data writing process is used to write data from a source database over a pipe to a data loading process which then loads the data into a target database. Embodiments may also apply to other systems and environments, as well as to other volatile data transfer mechanisms such as message queues for example.

Figure 1:
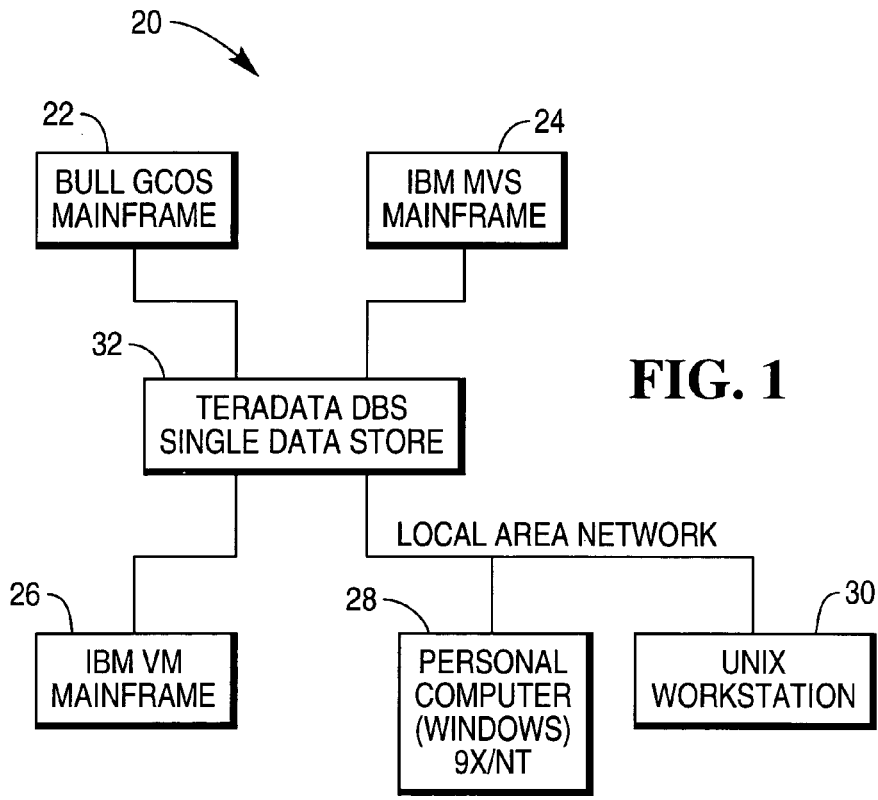
FIG. 1 is a block diagram illustrating an exemplary data warehousing system with which exemplary embodiments of the present invention may be utilized.

The system of FIG. 1 includes a single data store 32 which can be accessed and connected to any a number of client architectures. In this example, a variety of mainframe computers 22, 24, and 26 are connected to the data store 32 via channel connections. In addition, a personal computer 28 as well as a UNIX workstation 30 are also connected to the data store 32 via a local area network. In this example, all of these computers can access and manipulate the same database simultaneously.

Figure 2:
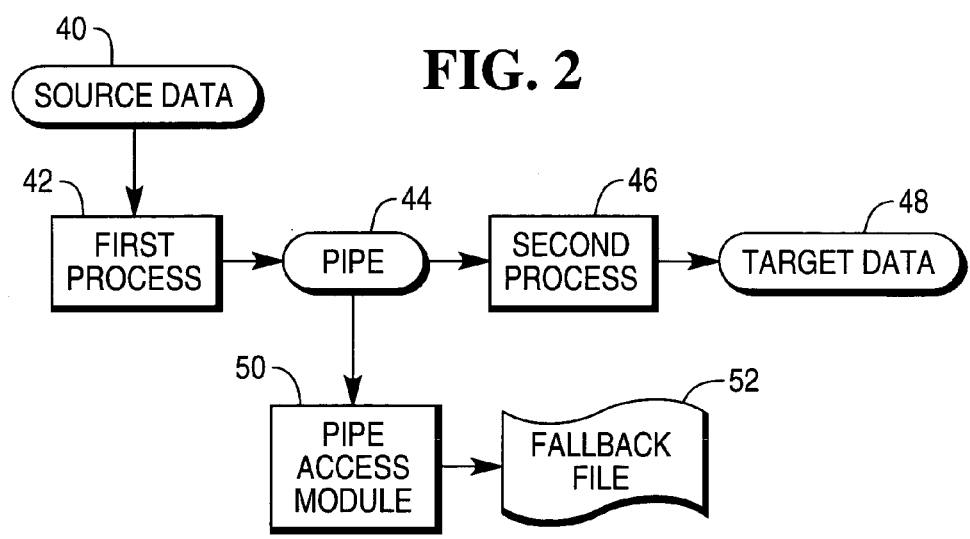
FIG. 2 is a block diagram illustrating an exemplary system which can be used to copy and/or monitor data transferred via a pipe for use in the event of an error condition, in accordance with principles of the present invention.

To load data from various computers to the data store 32, volatile data transfer mechanisms, such as pipes for example, can be utilized. FIG. 2 is a block diagram of an exemplary system which could be utilized to load data using a pipe. In this example, source data 40 is accessed by a first process 42 which writes the accessed data to a pipe 44. A second process 46 can then read the data from the pipe 44 and load it into a target database 48. The data may be transferred through the pipe 44 in portions, such as blocks of data for example. The size of the block may be settable by the user, or may be fixed.

In accordance with principles of the present invention, a pipe access module 50 accesses data in the pipe 44 and records the data to a fallback file 52. In addition, if desired, the module 50 can keep track, or a count, of the amount of data transferred through the pipe 44. If blocks of data are transferred, the count can be a count of the number of blocks transferred. Moreover, the module 50 can accumulate a signature which identifies the data which is transferred through the pipe 44.

As the second process 46 loads data into the target database 48, it can periodically provide a checkpoint signal or command to the module 50 indicating that data has been successfully loaded from the pipe 44 to the database 48. After such a signal, the module 50 can then save the next data block received in the pipe 44 at the start of the fallback file 52 over any previous data stored in that file 52 (except for perhaps the most recent block saved in the fallback file, as this block may not have been operated upon by the receiving process 46). (A pointer or address can be used to indicate where in the fallback file 52 the saving operation should take place.) Accordingly, the fallback file 52 can be kept relatively small in size in comparison with the source data 40 and the target data 48. Consequently, a large amount of storage space is not needed for the fallback file 52.

In the event of an error that allows for the resumption of data transfer from the first process 42 at the spot it had left off, the pipe access module 50 can transfer the saved data from the fallback file 52 to the second process 46. Thus, even if data in the pipe 44 or being acted on by the second process 46 is lost after the error, this data has been saved in the fallback file 52 and can still be salvaged. After the data recovery, the second process can continue transferring data to the pipe 44 at the point it had left off. (As known in the art, processes which write data to a pipe can wait until the pipe is no longer full or is otherwise ready before continuing writing additional data to the pipe.) Accordingly, the entire data transfer need not be re-started from the beginning, saving valuable time in the data transfer.

In the event of an error that does not allow the first process 42 to resume data transfer at the spot it had left off, the pipe access module 50 can utilize the saved data count and the signature to conduct a synchronization and validation of data. In particular, the data transfer process can be started at the beginning by the first process 42. However, the second process 46 need not operate on the first amount of data which corresponds to the data count. This is because this data had already been transferred during the original operations. Thus, time can be saved by avoiding duplicative operations by the second process 46 on this previously transferred data. In addition, the pipe access module 50 can accumulate another signature identifying this re-transmitted data. Once the amount of data transmitted is equal to the count for the original transmission, the two signatures can be compared. The signatures for the two transfers should match as the data should have been identical when the data transfer is restarted from the beginning. If the signatures do not match, then an error can be reported. The error can shut down the operation, request the user to shut down or continue the operation, or simply provide an error signal while allowing the operation to continue.

The source data 40 and target data 48 can reside in data stores or databases, and the first process 42, second process 46, and pipe access module 50 can comprise one or more software programs, algorithms, routines, instructions, and/or appropriately configured hardware. Moreover, the pipe 44 can comprise a named pipe, unnamed pipe, or other volatile data transfer mechanism, while the fallback file can comprise a data file or other non-volatile data storage mechanism or location.

Figure 3:
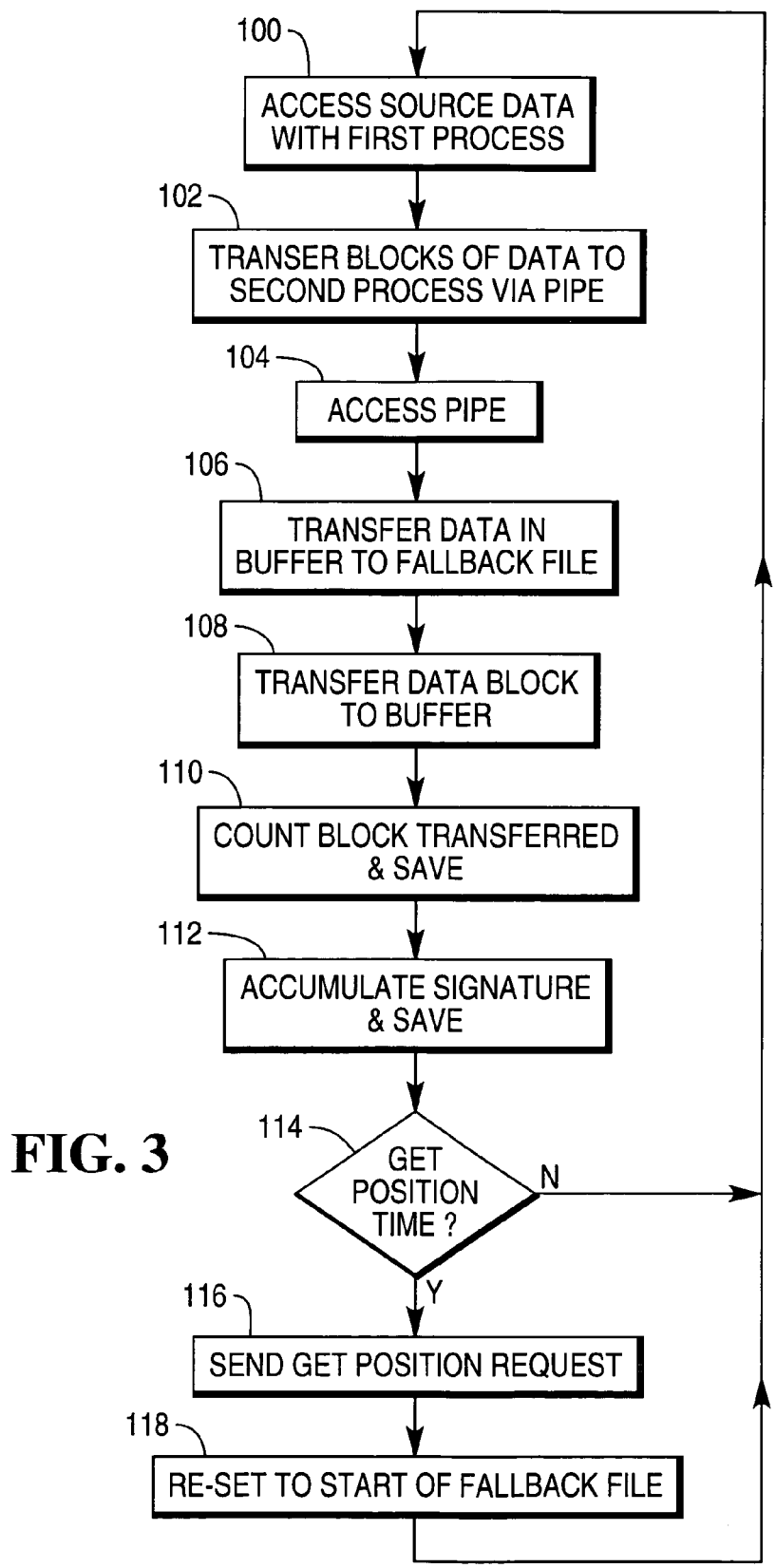
FIG. 3 is a flow diagram illustrating an exemplary method for saving information relating to data transferred via a pipe for use in the event of an error condition, in accordance with principles of the present invention.

FIG. 3 is a flow diagram that illustrates an exemplary method of operation that can be implemented by systems such as that of FIG. 2, such as via software, instructions, algorithms, routines, and the like. At block 100 of FIG. 3, source data is accessed by a first process. A block of this data is then transferred from the first process to the second process via a pipe, as shown at block 102. The data block being transferred via the pipe is accessed at block 104, such as via a software module or the like. Data in a buffer area is then transferred to a fallback file for use in data recovery if later needed, as shown at block 106. The data block from the pipe accessed by the module is then transferred to the buffer, as shown at block 108.

To keep track of the amount of data that has been transferred, a count is then incremented at block 110 so that the number of blocks that have been transferred can be maintained for later use if a re-start of the transfer is needed. In addition, an identifying signature is then accumulated at block 112. This signature is updated with each block of data that is transferred over the pipe. Encryption algorithms, such as an MD5 algorithm for example, or other suitable data identification algorithms can be used for this purpose. Such algorithms produce a signature, such as an identifying digital value, based upon the values in a larger portion of digital data. This identifying digital value is unique for the values in the portion of digital data being considered, or at least is statistically unique, meaning that the chances are reasonably low that two differing portions of data would produce the same identifying digital value. In the exemplary process of FIG. 3, this signature is updated for each block of data transferred through the pipe, such that there is an identifying signature maintained for all of the data that has transferred through the pipe.

Continuing to block 114, it is determined whether the time has been reached to issue a checkpoint signal (e.g., a "get position" signal) to indicate that the second process has successfully operated on or processed (e.g., loaded into the target database) the data it has received. Such a checkpoint signal can be provided periodically in terms of time or periodically in terms of amount of data transferred. In other words, the signal can be issued after a predetermined amount of time that the second process is operating successfully or after a predetermined amount of data has been processed by the second process successfully. If this period has not yet been reached, then the method returns to block 100. Accordingly, an additional block of data is accessed from the source data and transferred through the pipe, and this additional block is saved in addition to the previous block in the fallback file, the counter is incremented, and the signature is updated, as discussed earlier with respect to blocks 100-112.

However, if the time for issuing a checkpoint signal has been reached, then the process continues to block 116, at which point the checkpoint signal (e.g., "get position" request) is issued. When such a signal is issued, the pointer or address (or other indicator of where to save data) for the fallback file is re-set back to a predetermined point, such that future data can be saved over other unneeded data at the beginning of the fallback file. Thus, current data in the fallback file will not be maintained, as it will not be needed for data recovery because the checkpoint signal has indicated that the recently transferred data is safe. (It may be desirable however to maintain the most recent data in the fallback file as this data may not have been properly operated on by the receiving process) The method can then return to block 100, and future data accessed from the pipe is saved at the beginning of the fallback file. Accordingly, the size of the fallback file can be kept relatively low and is relative to the frequency that checkpoint signals are issued in this embodiment.

Figure 4:
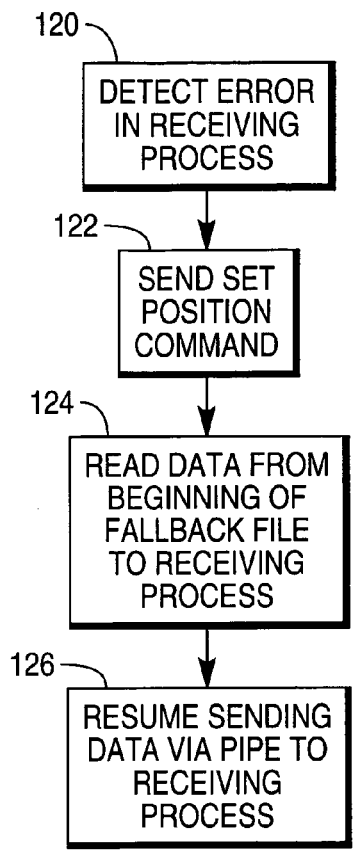
FIG. 4 is a flow diagram illustrating an exemplary method for re-starting a data transfer process via a pipe after an error condition using the fallback data created in the method of FIG. 3, in accordance with principles of the present invention.

FIG. 4 is a flow diagram illustrating an exemplary method for re-starting a data transfer process via a pipe after an error condition using the fallback data created in the method of FIG. 3, in accordance with principles of the present invention. At block 120 of FIG. 4 an error condition is detected in the receiving process, such as the process 46 of FIG. 2 for example. These errors can include processing errors, unexpected terminations, power errors and the like. Such errors can occur as data is being transferred from the sending process to the receiving process via the pipe.

After such an error, a restart command (e.g., a "set position" command) is provided to allow the data transfer operation to proceed again, as shown at block 122. Since the error is associated with the receiving process, the sending process need not start again at the beginning of the source data and actually can re-commence sending data to the pipe as soon as the pipe is not full. However, the data that was just previously in the pipe but already read by the receiving process is lost, due to the volatile nature of the pipe. Accordingly, this data may not have been successfully sent to the target database by the receiving process, and simply re-commencing the data transfer will not recover this data. However, the data can be recovered by transmitting the data in the fallback file to the receiving process, as shown at block 124. Because the data had been backed up in the fallback file, it is recoverable.

Once this data is successfully read from the fallback file and processed by the receiving process, then block 126 is executed causing the resumption of data transfer from the sending process to the receiving process via the pipe at the point at which the data transfer had last left off. As noted above, the sending process can remember where it was in the data transfer and pick up the transfer at the point, so long as the error did not affect its ability to re-start in this manner.

Figure 5:
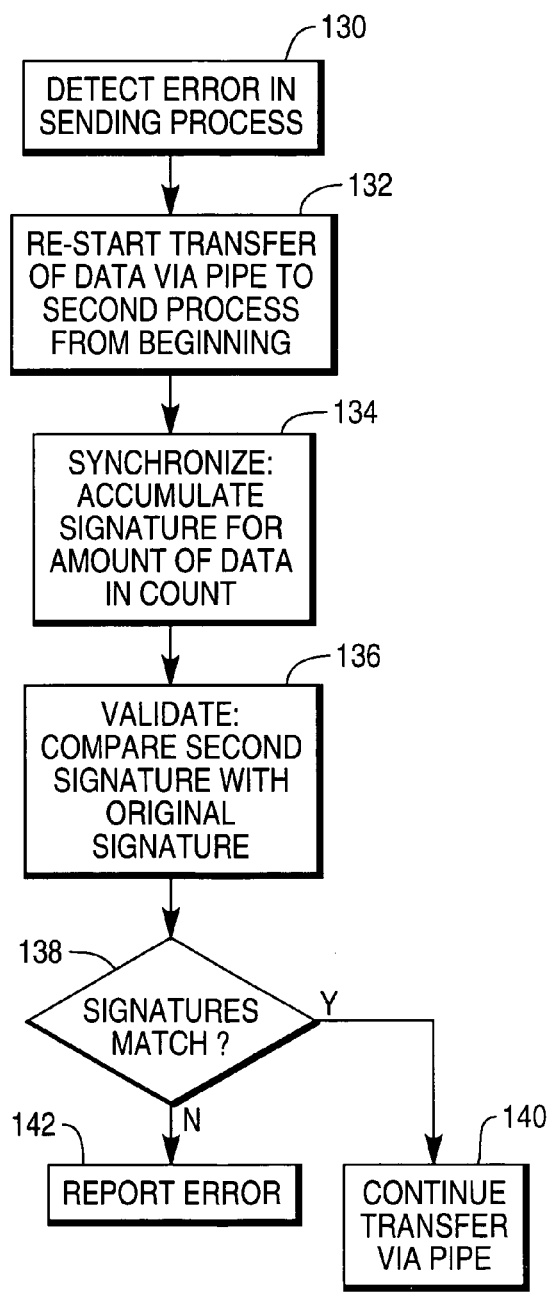
FIG. 5 is a flow diagram illustrating an exemplary method for validating that data re-transferred via a pipe after an error condition matches data originally transferred via the pipe, using the count and signature accumulated in FIG. 3, according to principles of the present invention.

FIG. 5 is a flow diagram illustrating an exemplary method for validating that data re-transferred via a pipe after an error condition matches data originally transferred via the pipe, using the count and signature accumulated in FIG. 3 according to principles of the present invention. Typically, such a method would be utilized if the error was of a nature that the sending process could not simply resume transfer of data to the pipe at the point at which it had last left off. Termination errors and power errors affecting the sending process are types of errors that may cause such a condition.

As shown in FIG. 5, at block 130, such an error is detected and a signal can be provided to re-start the process such as by providing a re-start command (e.g., a "set position" command). In the event of such an error, the data transfer process is re-started from the beginning, as shown at block 132. In other words, the first process moves back to the start of the data source and begins re-sending from the starting position in that data source. However, all the data need not be processed by the receiving process, as some of the data had already been received and processed by the receiving process. To determine how much data had already been received, the count which was saved could be utilized. For this amount of data, the data is not operated upon by the receiving process, as doing so would be redundant and thus inefficient.

However, to ensure that the data that is being re-transmitted is the correct and accurate data and had not been corrupted or otherwise modified, the signature features described above could be utilized. Any of a number of errors can corrupt or modify data (including network transfer related data problems, changes to the source data, and log overwriting problems) and so it can be important to ensure that the data has not been corrupted or modified when it is re-transmitted. In particular, as shown at block 134, in this illustrative embodiment, a verification signature is accumulated for the data up until the amount of transmitted data is equal to the previous count (at the point that the count is reached, the amount of data transmitted this second time should be identical to the amount originally transmitted).

This verification signature should be equal to the original signature accumulated when the data was first transferred, such as by using the illustrative process of FIG. 3. Accordingly, at blocks 136 and 138, the verification signature is compared to the original signature to determine if the two match. If the two do not match, then the data has been modified or corrupted or is otherwise not the same data. Consequently, an error is reported at block 142. After reporting or logging the error, the method can be configured to continue transferring data through the pipe and operating on that data by the receiving process. Alternatively, the error can be reported and the user can decide whether to continue data transfer, or the error can be reported and the data transfer terminated completely.

If the two signatures do match, however, the pipe data transfer can then resume in its normal fashion with the new data that had not been transmitted the first time. This step is shown at block 140.

Figure 6:
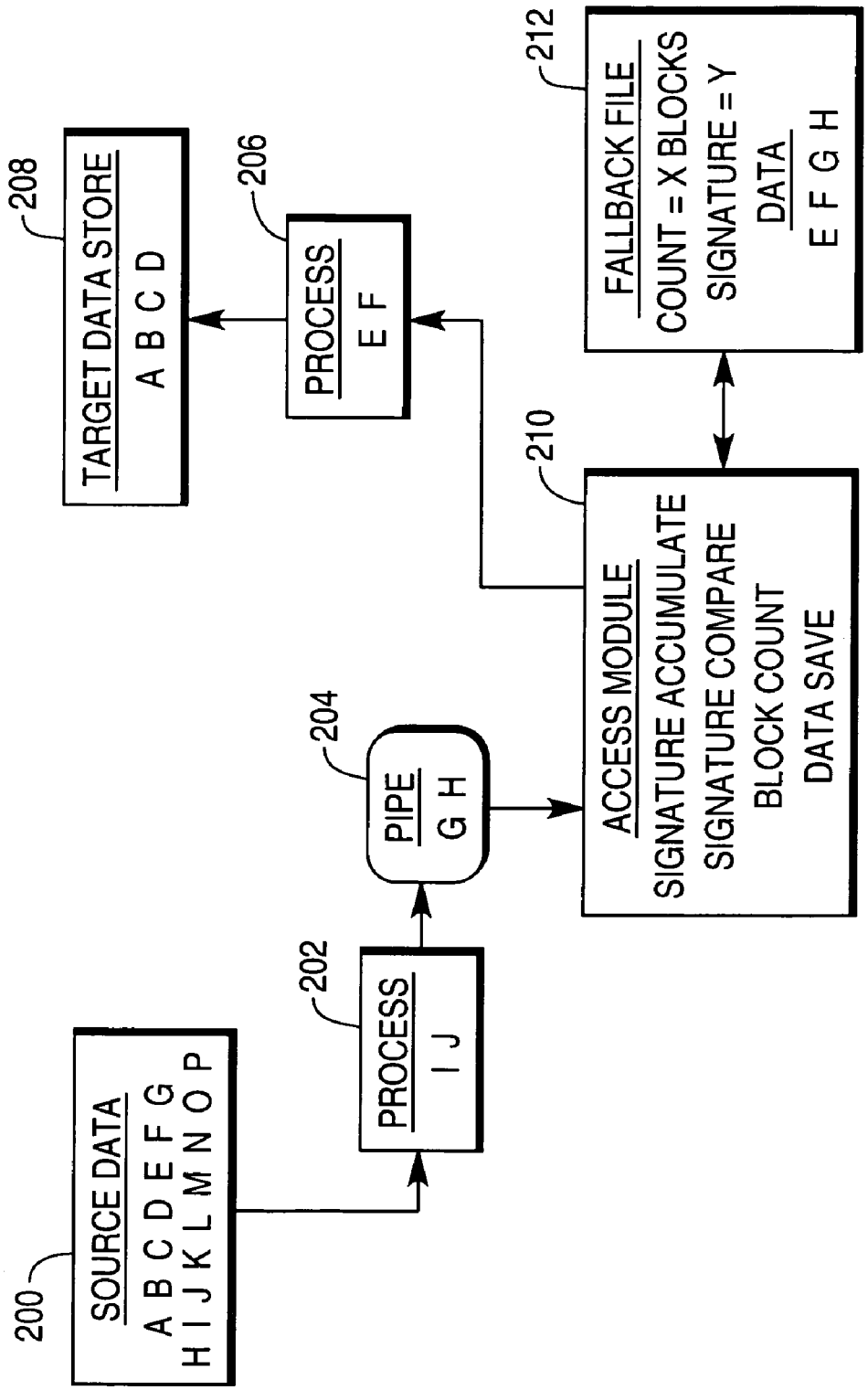
FIG. 6 is a block diagram illustrating an exemplary system which can be used to copy and/or monitor data transferred via a pipe for use in the event of an error condition, in accordance with principles of the present invention.

FIG. 6 is a block diagram illustrating an exemplary system which can be used to copy and/or monitor data transferred via a pipe for use in the event of an error condition, which utilizes one or more of the inventive principles described above. In this example, data is transferred from a source database 200 to a target database 208 via a pipe 204. A first process 202 sends the data to the pipe 204 and a second process 206 receives the data from the pipe via the access module 210. As seen in this example, the data is sent in portions or blocks, and not all at once. The size of such blocks may be settable by the user if desired.

As data is being sent, the access module 210 also communicates with the pipe 204 and saves the transferred data to a fallback file 212. In addition, this module 210 can also accumulate a signature for the data blocks being sent and save a count to indicate how much data has been sent. In addition to the backup data, the count and signature can be saved in the fallback file if desirable or in another non-volatile file or memory.

Periodically, a checkpoint command or similar signal can be provided to indicate that the second process 206 has successfully operated on a predetermined amount of data or for a predetermined amount of time. After such a command, the access module 210 can begin saving over data in the fallback file 212.

In the example of FIG. 6, the process 206 has provided a checkpoint command to the access module 210 after data portions A, B, C, and D had been successfully loaded to the target data store 208. Accordingly, the access module 210 no longer maintains a copy of data portions A, B, C, and D, and begins saving newly transferred portions E, F, G, and H over this previously stored backup data.

In the event of certain errors, the data (GH) in the pipe 204 and the data (EF) being operated on by the process 204 may be lost. However, this data can be recovered if the process 206 simply reads it from the stored fallback copy in the fallback file 212. If the process 202 has not been affected by the error, it can begin sending data (IJ) to the pipe 204 at the point that it had left off, and the data transfer can resume without starting from the beginning portion (AB) of the source data 200.

However, certain errors may not allow the data transfer from the process 202 to re-start from where it had left off. Errors in the process 202 are such errors which might cause the process 202 to lose its position and force it to re-start from the beginning (AB) of the data 200. In such an event, this exemplary embodiment allows validation of data during the re-transmission. In particular, the access module 210 can obtain the count from the file 212 and know how much data had already been transferred. It can then resume the data transfer starting at the beginning (AB) and accumulate a signature for a portion of the data during the re-transmission.

For instance, if four blocks A, B, C, and D of data had already been transferred through the pipe 204 and loaded to the database 208, the access module 210 would then accumulate a signature for the first four blocks during the re-transmission. In addition, the process 206 could be prevented (by the access module 210 or other program or routine) from operating on those blocks, as doing so would be inefficient because the blocks had already been operated on previously. After the four blocks had been transferred and a second signature accumulated for them, the second signature can be compared to the original signature accumulated and stored in the fallback file 212. If the two signatures match, there is a high chance that the data originally transferred and the data transferred after the restart are identical, as they should be. However, if the signatures do not match, then the data may have been corrupted or modified, and an error can be reported by the access module 210. After the four blocks have been transferred, the process 206 can be allowed to continue process future data from the pipe 204 as it normally would.

Figure 7:
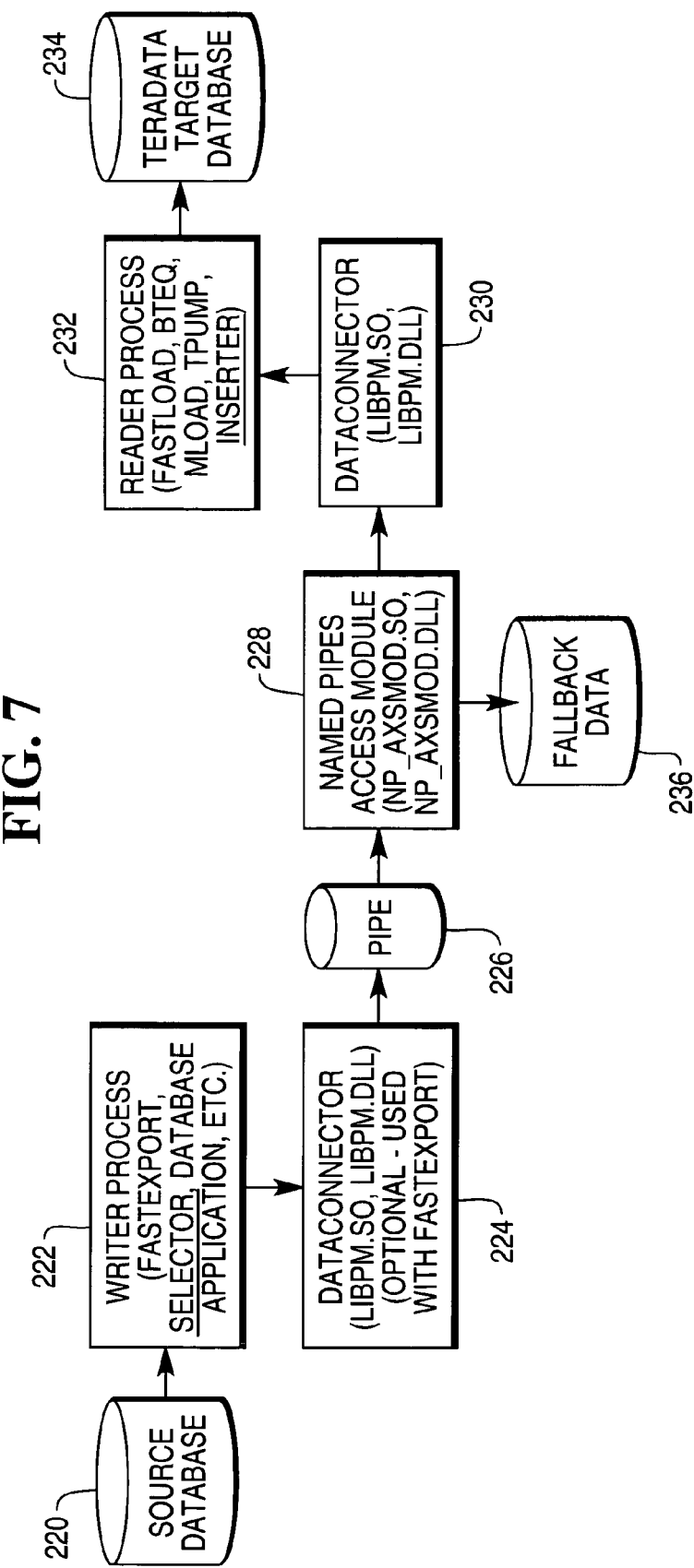
FIG. 7 is a block diagram illustrating another exemplary system which can be used to copy and/or monitor data transferred via a pipe for use in the event of an error condition, in accordance with principles of the present invention.

FIG. 7 is a block diagram illustrating another exemplary system which can be used to copy and/or monitor data transferred via a pipe for use in the event of an error condition, the system being made in accordance with principles of the present invention. The system can operate in a manner similar to the operation of the system of FIG. 6. However, in this example, the first process is a writer process 222 which accesses source database 220 and is connected to the pipe 226 by a data connector 224. Moreover, the second process is a reader process 232 which receives the data from the pipe 226 by way of a data connector 230 and which then loads the data to a TERADATA target database 234. The Named Pipes Access module 228 accesses the data in the pipe 226 and can save the information discussed above, including a fallback copy of the data, a count of the amount of data transferred, and/or a signature for the data. This information can be saved in one or more fallback files 236 or similar memory locations. While this datawarehousing system of FIG. 7 is one particular environment which can benefit from one or more of the inventive aspects, these aspects could apply to many other environments and system configurations as well.

An additional exemplary embodiment of pipe access module software and a related computer system which can implement various aspects of the present invention will now be described in detail for the remainder of this Section. While detailed information regarding this illustrative embodiment is provided, it should be understood that many other variations and modifications are possible without departing from the principles and aspects of the present invention as defined by the claims appended hereto.

Overview

Named pipes interprocess communication technology currently exists on both UNIX and WIN32 platforms. The illustrative named pipe access module described below, made and operating according to principles of the present invention supplements standard named pipes interprocess communication with checkpoint and restart between complementary data transfer utilities such as the FAST-LOAD and FASTEXPORT utilities for example. These existing utilities already work with UNIX named pipes. However, checkpoint and restart are conventionally not possible with pipes since pipes do not allow the user to seek to an earlier position. This Named Pipes Access Module embodiment supplements the speed and convenience of named pipes with checkpoint and restart capability by caching data in a fallback data file. When used with utilities such as FASTLOAD to transfer data, these modules allow quick recovery from restarts in the destination database, and crashes on the system running FASTLOAD.

Though the module (referred to sometimes herein as the Named Pipe Access Module or Access Module) is designed primarily to operate on named pipes, it can also operate on ordinary files or on file descriptor devices (e.g. in UNIX). Unless otherwise specified, this document uses the term pipe to include any of the following: a named pipe device, a file descriptor file system device (e.g. UNIX), and an ordinary file.

The Named Pipes Access Modules can be coded in standard C++ to optimize use of common source code between the UNIX modules and the WIN32 module. The UNIX Named Pipes Access Module can be ported to any SVR4-based UNIX platform. For example, the module can be ported to the following UNIX-based operating systems: NCR's MP-RAS 3.02, SUN Solaris on SPARC, and SUN Solaris on Intel. Any reference to UNIX in this document includes all these versions.

Though FASTLOAD is a utility that can use the module, either MULTILOAD or TPUMP could replace FASTLOAD with the same effect.

Moreover, the access module can operate not only with the "classic" client utilities FASTLOAD, MULTILOAD, and TPUMP but also with the TERABUILDER infrastructure on MP-RAS (NCR's operating system based on UNIX SVr4).

Figure 8:
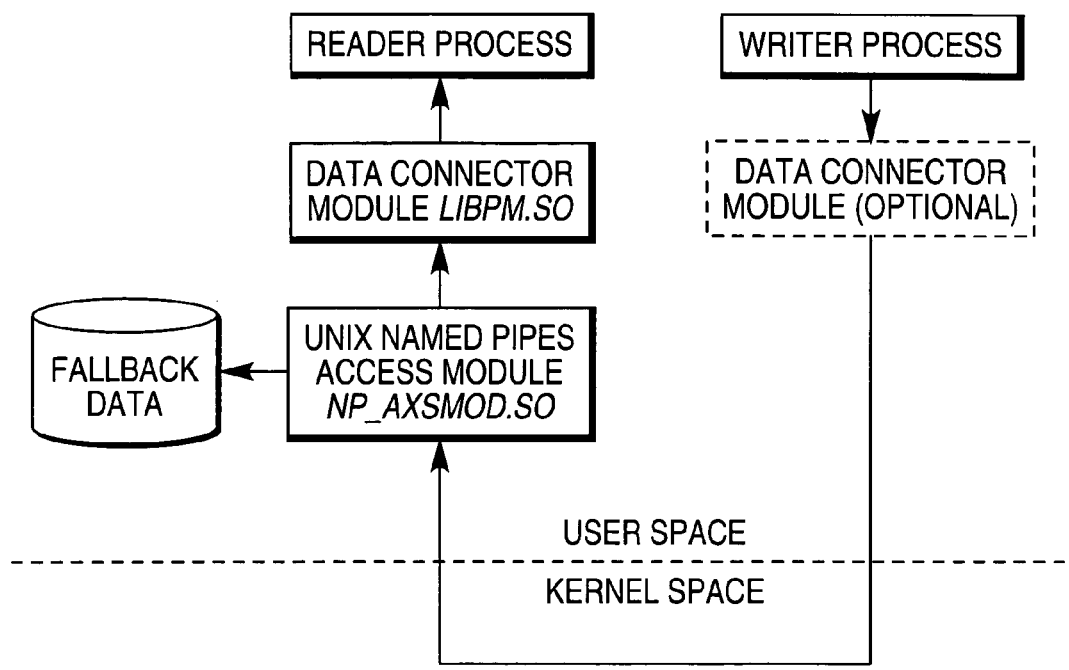
FIG. 8 is a block diagram showing an exemplary software environment in which an exemplary pipe access module can reside, in accordance with principles of the present invention.

Relationship between Access Module and Data Connector in UNIX with Classic Utilities FIG. 8 shows an exemplary software environment in which the UNIX Named Pipes Access Module can resides when used with classic TERADATA loading utilities. This figure shows the flow of data between a writer process, such as the TERADATA FASTEXPORT utility for example, and a reader process, such as the TERADATA FASTLOAD utility for example. To take advantage of the UNIX Named Pipes Access Module, the reader interfaces to the Data Connector Module. Either a UNIX named pipe or unnamed pipe connects both processes in this embodiment.

On the reader side, the UNIX Named Pipes Access Module, np_axsmod so, tracks the data flow, copying the inbound data into a fallback data file. If the reader process determines that it must fall back to an earlier point in the data stream, it issues the standard File Set Position access command to np_axsmod, which then supplies subsequent reads from the data it saved in the fallback data file.

On UNIX, both the writer process and the reader process should reside on the same system since UNIX pipes cannot span a network. Note that the writer process does not require an instance of the Data Connector Module. In fact, the writer process could be any third-party application that supplies data through the named pipe in the format the reader process expects.

Using the Named Pipes Access Module in UNIX with Classic Utilities

In UNIX the module can support transfer through named pipes, unnamed pipes and files.

A user can connect two processes via named pipes in UNIX in the following way:

Create a named pipe, using the command mknod with the p option.

Program the writer process to send its output to the named pipe.

Program the reader process to read from the named pipe.

Launch the two processes.

Here is an example shell command:

/sbin/mknod pipename p dd of =pipename </etc/motd & dd if=pipename &

The contents of /etc/motd then appear as the standard output from the second command.

In terms of the UNIX Named Pipes Access Module, the user could first create a named pipe, e.g./tmp/mypipe. The user can then program the reader application to specify /tmp/mypipe as the file that the module opens. For example, in FASTLOAD, the user could code a command script flod.cmds, containing statements similar to:

axsmod np_axsmod.so "fallback_directory= . . . ";

define file=/tmp/mypipe . . . ;

The user could then also code a FASTEXPORT script fexp.cmds, containing a statement similar to:

.EXPORT OUTFILE /tmp/mypipe;

The user could then launches FASTEXPORT and FASTLOAD with shell commands similar to the following:

fexp <fexp.cmds >fexp.out & FASTLOAD <flod.cmds &

UNIX then connects both processes through the named pipe /tmp/mypipe.

If the destination database restarts, the access module cooperates with FASTLOAD to automatically restart at the last checkpoint.

As for unnamed pipes, in UNIX two processes also can be connected using unnamed pipes corresponding to open file descriptor file system (i.e./dev/fd) devices. (There is currently no counterpart to the file descriptor file system in WIN32.) To plumb together two UNIX processes, using unnamed pipes and file descriptor file system devices, the user can: 1) Program the writer process to send its output to a file descriptor device greater than 2 (stderr), e.g./dev/fd/4. 2) Program the reader process to read from a file descriptor device greater than 2 (stderr), e.g./dev/fd/3. 3) Plumb the resulting file descriptors together, using a shell pipeline such as the following:

dd of =/dev/fd/4 4>&1</etc/motd | dd if=/dev/fd/3 3<&0

The contents of /etc/motd then appear as the standard output from the last command in the pipeline.

In terms of the UNIX Named Pipes Access Module, the user can program the application to specify a file descriptor file system device as the file that the module opens. For example, in FASTLOAD, the user can code a command script flod.cmds, containing statements similar to axsmod np_axsmod.so "fallback_file= . . . ";

define file=/dev/fd/3 . . . ;

The user also codes a FASTEXPORT script fexp.cmds, containing a statement similar to .EXPORT OUTFILE /dev/fd/4;

The user can then plumb FASTEXPORT to FASTLOAD with a shell pipeline similar to the following:

fexp <fexp.cmds 4>& 1>fexp.out | \

FASTLOAD 3<&0<flod.cmds >flod.log

FASTEXPORT's normal standard output is then diverted into the file fexp.out.

If the destination database restarts, the access module cooperates with FASTLOAD to automatically restart at the last checkpoint.

Figure 9:
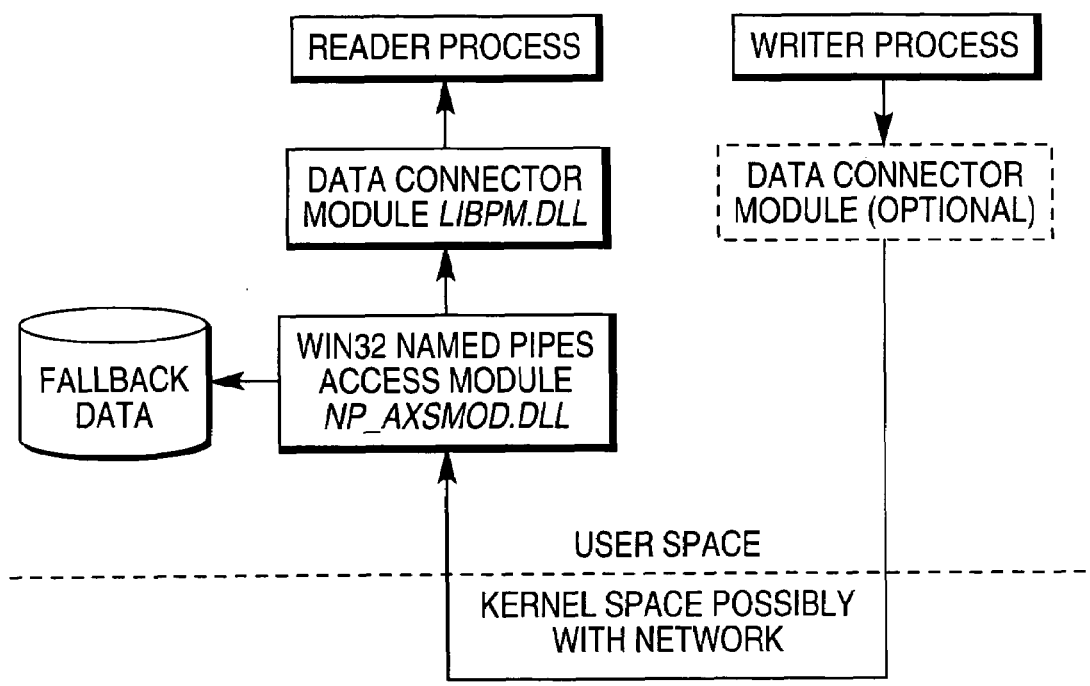
FIG. 9 shows an exemplary software environment in which an exemplary pipe access module can reside, in accordance with principles of the present invention.

Relationship Between Access Module and Data Connector in WIN32 with Classic Utilities FIG. 9 shows an exemplary software environment in which the WIN32 Named Pipes Access Module can reside with classic TERADATA loading utilities. This figure shows a similar data flow between a writer and a reader process in a WIN32 environment. Unlike UNIX named pipes, WIN32 named pipes can span networks. Thus, the reader and writer processes can reside on separate systems.

On the reader side, the Named Pipes Access Module, np_AXSMOD.dll, can track the data flow, copying the inbound data into a fallback data file. If the reader process determines that it must fall back to an earlier point in the data stream, it issues a standard File Set Position access module command to np_AXSMOD.dll, which then supplies subsequent reads from its backed-up data.

Note that the writer process does not require an instance of the Data Connector Module. In fact, the writer process could be any third-party application that supplies data through the named pipe in the format the reader process expects.

Since WIN32 currently does not implement a file descriptor file system, the WIN32 Named Pipes Access Module does not need to support interconnection through unnamed pipes. The WIN32 Named Pipes Access Module can be installed on a WINDOWS NT system or a WINDOWS 2000 system for example.

Using the Named Pipes Access Module in WINDOWS NT and WINDOWS 2000 with Classic Utilities Under WINDOWS NT technology the module supports transfer through named pipes and through files. In WINDOWS NT and WINDOWS 2000, a user connects two processes via named pipes by doing the following:

1. Programming the reader process to specify the Named Pipes Access Module
2. Programming the writer process to send its output to the named pipe
3. Launching the reader process
4. Launching the writer process The reader process should be launched before the writer process, by following these steps:

1. For example, in FASTLOAD, the user can code a command script flod.cmds, containing statements similar to
   axsmod np_AXSMOD.dll "fallback_directory= . . . ";
   define file=\\.\pipe\mypipe . . .
2. The user can also code a FASTEXPORT script fexp.cmds, containing a statement similar to:
   .EXPORT OUTFILE \\.\pipe\mypipe;
3. The user can then launch FASTEXPORT and FASTLOAD from separate command (CMD.EXE) WINDOWS. For example, in the first command window, the following command can be typed:
   FASTLOAD <flod.cmds
4. Then, the user can wait for FASTLOAD to issue the message:
   Starting to send to RDBMS with record 1
5. In the second command window, the following command can then be typed:
   fexp <fexp.cmds
   WINDOWS then connects both processes through the named pipe \\.\pipe\mypipe.

Named Pipes follow Microsoft's Universal Naming Convention (UNC) of which the general form is
\\system_name\pipe\unique_name Thus the user transfers data between systems by specifying the server's name as system_name in the pipe's name. The user specifies the system_name as '.' to designate the local system.

Restarting a Job with Classic Utilities

If the pipe reader process terminates unexpectedly, the user may restart the transfer. This process is called "writer-side recovery." In general, and as discussed above with respect to other embodiments, the pipe writer process restarts from its beginning, but the pipe reader falls back to its last checkpoint, allowing the access module to synchronize and validate the two. This saves time since the pipe reader process does not have to reinsert into the destination table those records that have already passed through the pipe. The user may need to take the following additional steps, depending on the utilities employed:

Prepare the source for a clean start. FASTEXPORT can use a log table to know that a previous instance was interrupted. To start an interrupted FASTEXPORT job from its beginning, the user can first drop the FASTEXPORT log table. The log table is specified by the original FASTEXPORT script's .logtable statement. As far as FASTEXPORT is concerned, dropping the log table erases any knowledge of a previous job.

Prepare the destination script. To restart FASTLOAD, the user can first modify the FASTLOAD script to:
Remove any statement which drops the table being loaded
Remove any statement that creates the table that was being loaded.
Restart the job, using commands similar to those described above.

The access module can then use the fallback file left over from the interrupted job to locate the proper position in the data flowing through the pipe.

Figure 10:
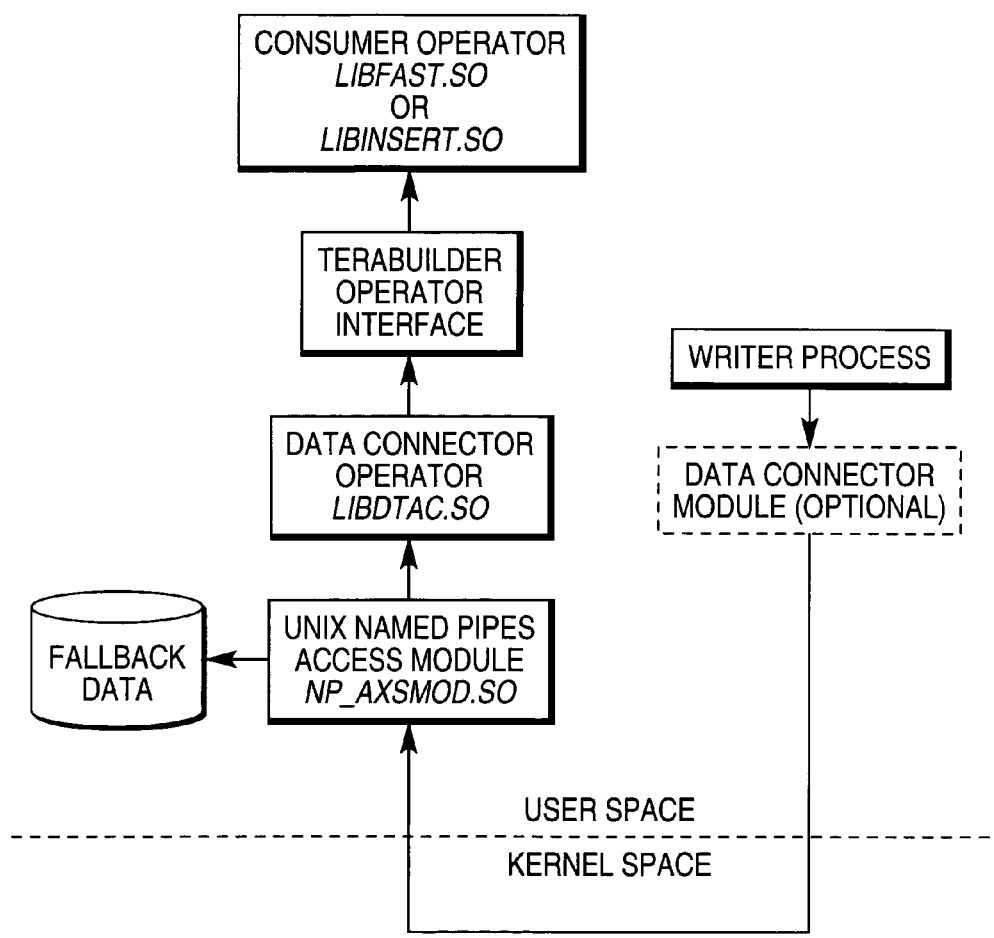
FIG. 10 is a block diagram illustrating an exemplary pipe access module, made and operating according to principles of the present invention, and showing the flow of data between a writer process and a consumer operator in a system using the pipe access module.

Relationship Between Access Module and Data Connector in MP-RAS with TERABUILDER Infrastructure FIG. 8 shows the software environment in which the UNIX Named Pipes Access Module resides when used with TERABUILDER. FIG. 10 shows the flow of data between a writer process, such as the TERABUILDER infrastructure with a producer operator, and the TERABUILDER infrastructure with a consumer operator. Supported consumer operators can include the FASTLOAD operator, libfast.so, and the SQL Inserter operator, libinsert.so. Supported producer operators can include the FASTEXPORT operator, libfexp.so, and the Selector operator, libsel.so. A UNIX named pipe can connect both processes. In this embodiment, the TERABUILDER Operator Interface connects to the Data Connector operator, libdtac.so, which interfaces to the UNIX Named Pipes Access Module.

On the reader side, the UNIX Named Pipes Access Module, np_axsmod.so, tracks the data flow, copying the inbound data into a fallback data file. If the TERABUILDER infrastructure determines that it must fall back to an earlier point in the data stream, it notifies the Fast1Load operator, which notifies the Data Connector operator, which issues the standard File Set Position access command to np_axsmod.so. The module then supplies subsequent reads from the data it saved in the fallback data file.

On MP-RAS both the writer process and the TERABUILDER infrastructure can reside on the same system since UNIX pipes typically cannot span a network.

Note that the writer process does not require an instance of the Data Connector Module. In fact, the writer process could be any third-party application that supplies data through the named pipe in the format the TERABUILDER infrastructure expects.

Using the Named Pipes Access Module in UNIX with TERABUILDER

In UNIX the module supports transfer with TERABUILDER through named pipes and files. An exemplary user document for TERABUILDER is TERABUILDER Reference. An exemplary user document for TERABUILDER operators is TERABUILDER Operators Reference. These documents are available from NCR Corporation and are hereby incorporated herein by reference.

To use the UNIX Named Pipes Access Module with TERABUILDER, the user first creates a named pipe, e.g./tmp/mypipe. The user then creates a TERABUILDER import script specifying /tmp/mypipe as the filename that the module opens. For example, the script tbuildimp.txt contains a statement similar to the following, defining the Data Connector operator:

```
DEFINE OPERATOR DataConnector ( )
TYPE PRODUCER OUTPUT SCHEMA Tab3Schema
EXTERNAL NAME 'libdtac.so'
ATTRIBUTES
(
VARCHAR FileName ='/tmp/mypipe',
VARCHAR OutputLogFileName ='DcImport.log',
VARCHAR AccessModuleName ='np_axsmod.so',
VARCHAR AccessModuleInitStr ='Id=. fd=.',
VARCHAR IndicatorMode ='N',
VARCHAR OpenMode ='Read',
VARCHAR Format ='Formatted'
);
```

In this embodiment the following attributes are relevant to the Named Pipes Access Module:

The FileName attribute specifies name of the named pipe.

The AccessModuleName attribute specifies the Named Pipes Access Module, np_axsmod.so.

The AccessModuleInitStr attribute specifies the access module's initialization string.

All other Data Connector attributes are transparent to the access module.

The user can also code an export script, tbuildexp.txt, which includes a statement similar to the following:

```
DEFINE OPERATOR DataConnector( )
TYPE CONSUMER INPUT SCHEMA Tab3Schema
EXTERNAL NAME 'libdtac.so'
ATTRIBUTES
(
VARCHAR FileName='/tmp/mypipe',
VARCHAR OutputLogFileName='DcExport.log',
VARCHAR IndicatorMode ='N',
VARCHAR OpenMode ='Write',
VARCHAR Format ='Formatted'
);
```

The FileName attribute specifies a pipe name which should match that in the import script. Though the access module does not use the IndicatorMode and Formal attributes, the values should agree in both scripts.

The user then launches the TERABUILDER export and import jobs with shell commands similar to the following:

tbuild-f tbuildexp.txt & tbuild-f tbuildimp.txt &

UNIX connects both jobs through the named pipe /tmp/mypipe.

Although connecting two TERABUILDER jobs through the UNIX Named Pipes Access Module is a supported configuration, TERABUILDER can connect a producer operator and a consumer operator within the same job.

Restarting a Job under the TERABUILDER Infrastructure

If the transfer terminates unexpectedly, the user may restart the transfer. In this embodiment, under TERABUILDER the pipe writer process restarts from its beginning, but on the pipe reader side, the TERABUILDER infrastructure, falls back to its last checkpoint, allowing the access module to synchronize the two. This saves time since the TERABUILDER infrastructure does not have to reinsert into the destination table those records that have already passed through the pipe.

To specify a restart, the user issues the tbuild command with the "-r" option, similar to the following:

tbuild-f tbuildexp.txt & tbuild-r-f tbuildimp.txt &

Within the TERABUILDER infrastructure, the consumer operator can not automatically direct the access module to restart as do the classic loading utilities. All restarts allow the operator to restart the job with the tbuild "-r" option.

Usage Constraints

Because it reads raw data from the pipe, the module of this exemplary embodiment does not distinguish a premature end-of-data from a normal end-of-data from the reader process' point of view. That is, the module is unaware of any data formats imposed by the pipe reader and writer processes. For example, if the writer process terminates before transferring all its data into the pipe, the module perceives this as a normal end-of-file at the pipe level. The module reports it as such to the reader process. Thus the module does not determine whether all data transferred successfully. On the File Close command following end-of-file, the module normally deletes the fallback data file to reclaim its space. If the writer process exits prematurely, the module unknowingly deletes the fallback data. Hence the module in this embodiment does not perform writer-side recovery. The user can decide whether to delete the fallback data by setting the confirm_fallback_deletion option, as discussed in more detail below.

The Named Pipes Access Modules of this example do not interact with or otherwise control the writer process. If the reader process terminates unexpectedly, the operator can stop and restart both processes, such as discussed above.

The module of this embodiment saves data in the fallback data file since the last block before the last File Get Position command. It overwrites earlier fallback data, optimizing space. The module rejects the Data Connector's attempt to reset to any file position other than that returned in the last File Get Position command with either pmrcFailure (if the format was wrong) or pmrcBadChkPtMode (if the value was wrong).

An exception is that if the reader process has not read a data block since the last Get Position command, it can issue a Set Position command, designating the position returned either by the last Get Position command or by the next-to-last Get Position command.

If the user specifies a fallback file name as part of the initialization string, the module can allow the user to open one pipe per instance. This is due to the one-to-one correspondence between open pipes and fallback files in this embodiment. Alternately, the user can allow the module to manage the fallback file name either by specifying a directory name for the fallback data files or by accepting the default directory.

If the user specifies a device that is likely to be opened by more than one process at once (e.g. a file descriptor file system device) then the user should specify a fallback filename rather than use automatic fallback file name generation. This can be done using the fallback_file option in the initialization string.

This exemplary module creates a fallback data file that grows large enough to hold a copy of all data passing through the module between two successive checkpoints. The Data Connector's issue of the File Get Position command delimits checkpoints. The user should specify a directory that has enough free space to contain the fallback data file. Otherwise, the module will not be able to provide the Data Connector a copy of earlier data if the Data Connector requests it.

The module optionally creates and appends messages to a log file; however, the module does not restrict the log file's growth. Thus the user should determine when to truncate or to delete log files. When the log level is set to 4 or less, the module writes a minimum number of messages to the log.

WIN32 named pipes implement client and server concepts. Within these concepts, a named pipe can be created on either a WINDOWS NT or a WINDOWS 2000 system, which then acts as a named pipes server. A named pipes client runs on any WIN32 platform. The named pipes client does not create a named pipe in this exemplary embodiment. Instead, the client should open an existing named pipe created by the server side. The WIN32 Named Pipes Access Module is designed to create the server end of a WIN32 named pipe. Because of this, the WIN32 Named Pipes Access Module is only installed on either a WINDOWS NT or a WINDOWS 2000 system in this embodiment. It is not installed on a WINDOWS 95 or a WINDOWS 98 system. However, the product can work with a client utility (e.g. FASTEXPORT) installed on a WINDOWS 95 or a WINDOWS 98 system.

In WINDOWS, the named pipes server side should be started before the named pipes client is started. In terms of the product, the pipe reader utility, which interfaces to the access module, should be started and allowed to block on the named pipe before starting the pipe writer program. For example, the FASTLOAD utility can display the message
Starting to send to RDBMS with record 1
when it first blocks to read data from the named pipe. At this point the user should start the writer program.

If the pipe writer is started first, it discovers that the server has not yet created the named pipe then reports an error.

Unlike the classic TUF loading utilities, TERABUILDER does not use the file descriptor file system devices to connect a writer process with the reader process through the access module. Further, TERABUILDER jobs are handled through a background process, making them unavailable to shell plumbing through unnamed pipes.

As explained above, a TERABUILDER job should be launched a second time with the tbuild "-r" option. The process that writes to the named pipe is restarted from its beginning.

Interfaces

The Named Pipes Access Module of this exemplary embodiment has these main interfaces:
the API between the module and the Data Connector
an interface to the user through the log file in UNIX and in WIN32 environments
a few WINDOWS dialogs in the WIN32 environment
a limited console-oriented exchange in the UNIX environment Function Requests from Data Connector Below is described how the module handles commands from the Data Connector.

In general, the module returns to the Data Connector a code of pmrcOK, indicating a successful outcome. For failing commands, most descriptions provide a table listing the possible error codes that the module returns. The table includes the associated "Data Connector Explanatory Text", that the Data Connector logs. This text originates within the Data Connector except when the return code is pmrcFailure, in which case the access module provides the text. The table also includes a description of the error's cause.

Access Module Initialization

This command creates and initializes a per-instance data structure, passing initialization parameters from the Data Connector via the initialization string InitStr. Table 1 lists the failure conditions defined for this command and the error codes they return.

TABLE 1

Access Module Initialization Error Codes

| Error Code | Data Connector Explanatory Text | Description |
| --- | --- | --- |
| pmrcBadVer | The Data Connector version is incompatible with Client | The Data Connector interface verizon number does not match the access module interface version number. This occurs if incompatible packages are installed. |
| pmrcFailure | (See Appendix E.) | A general failure occurred. A memory allocation error is the most likely cause. |
| pmrcAllocErr | Error encountered during memory mgmt | A memory allocation error occured. |

File Open

This command directs the module to open the given file or device. The module verifies the following conditions:
the open mode is for reading (pmOpenModeR)
the specified file system object is not a directory
the file or device exists and can be opened
If the file system object does not exist, the module attempts to create it as a named pipe.

In UNIX, the module creates the named pipe using the calling process' umask value. Further, the UNIX module creates all intermediate subdirectories.

The module tests to see whether a fallback data file exists. If the module finds that no fallback data file exists, it creates a fallback data file.

On success, the module internally creates a per-file data structure containing the state variables associated with the open pipe.

Table 2 lists the failure conditions defined for this command and the error codes they return.

TABLE 2

File Open Error Codes

| Error Code | Data Connector Explanatory Text | Description |
| --- | --- | --- |
| pmrcBadParm | Bad parameter passed to Access Module API | The file open mode was not a recognized value. |
| pmrcFailure | (See Appendix E.) | The initialization string specified a fallback file name and a pipe device is already open. The module could not open or create the pipe device. A directory (vs. a file or device) was specified. |

TABLE 2-continued

File Open Error Codes

| Error Code | Data Connector Explanatory Text | Description |
|---|---|---|
| pmrcUnsupported | Request unsupported by Access Module | The file open mode is not pmOpenModeR. |
| pmrcOpenFiles | Access Module still has open files | An Open File was issued against the already-open handle. |

File Close and File Close and Release Media

The module treats these two commands similarly, closing the named pipe, and closing the fallback data file. On the File Close and Release Media command, the module automatically deletes the fallback file. Otherwise, on the File Close command, the module determines if it is possible to delete the fallback file based on the options and the completion of the transfer of data. The module always returns the code pmrcOK to these commands.

File Read

This command directs the module to transfer data from the named pipe to the requested user buffer. Before transferring the information, the module writes a copy of the preceding block to the fallback data file.

The File Read reads either from the pipe or (during restart) from the fallback file. It only writes a copy of the data to the fallback file if data were read from the pipe. Whether the module is actually reading from the pipe or from the fallback file is transparent to the user.

The module of this example always attempts to transfer a number of bytes equal to the block size. If the pipe writer writes small bursts of data to the pipe, the module reads from the pipe as often as necessary to accumulate an entire block. The last block may be a short block or an end-of-file indication. The module returns the number of bytes read from the pipe, or if all data have been read, an end-of-file return code, pmrcEOF.

Table 3 lists the failure conditions defined for this command and the error codes they return.

TABLE 3

File Read Error Codes

| Error Code | Data Connector Explanatory Text | Description |
|---|---|---|
| pmrcDataFormatErr | Unexpected data format | During recovery the module attempted to read from the fallback data file and an error occurred. |
| pmrcFailure | (See Appendix E.) | The file has not been opened. An error other than end-of-file occurred on reading the pipe. An error occurred reading data from the fallback data file. |
| pmrcEOF | End-of-file | End of file. The module read zero bytes from the pipe. |

File Write

Because the module does not write to a named pipe, it rejects this command as unsupported with the standard return value pmrcReadOnly. The corresponding Data Connector log message is "File is open for read operations only".

The module also writes message number 6 to the error log. However, because the Data Connector rejects attempts to write to a read-only data access device, hence this situation should never occur.

File Get Position

The access module treats the receipt of the File Get Position command as a checkpoint. That is, the module interprets this command as the Data Connector's confirmation that it has accepted and stored all blocks up to (but not including) the last block the Data Connector read.

On its receipt of this command, the module does the following:

1. If the previous command was a File Open and a valid fallback file was located, it ignores the sync point data in the file, and assumes that the Data Connector wishes to start a new transfer rather than recover the earlier transfer.

2. Attempts to create a fallback file if one is not already open. This occurs if the module closed and deleted an earlier fallback file because the file system ran out of space.

3. Updates the fallback file's Synchronization Header with the last two sync points. A sync point contains the number of the last block read by the Data Connector and the 16-byte signature of all data up to and including that last block. It flushes the Sync Header to disk.

4. Returns to the Data Connector the number of last block the Data Connector read. The block number is a 64-bit unsigned integer. If the Data Connector has not yet read a block, the module returns block number 0. If the Data Connector has read exactly one block, the module returns block number 1.

The Data Connector saves the checkpoint information returned in the File Get Position command for use in a possible Set File Position command, as described below.

When this command succeeds, it returns pmrcOK.

File Set Position

This command directs the module to rewind its pointer for reading data from the fallback data file to an earlier position in the fallback file. The Set Position passes the number of the block it intends to read next. The block number can be one of two values:

The number returned in the last File Get Position, or

If no block has been read since the last File Get Position, the number returned in the next-to-last File Get Position. By design the latter corresponds to the first data block in the fallback data file.

If the module has an unwritten block in the block buffer, the module does one of the following:

If the value corresponds to the unwritten block, the module writes the block to the position of the first data block in the fallback file then sets the file read pointer back to that position Otherwise the module writes the block to the current position in the fallback file and sets the file read pointer to the position of the first data block in the file.

Subsequent File Read commands draw data from the fallback data file instead of from the named pipe. The module's per-file data structure tracks the position in the fallback file. When the fallback data have been completely read, the module reads from the pipe again.

If the module is already reading from the fallback data file, it properly honors File Get Position and File Set Position commands to positions within the fallback data file.

The module logs any File Set Position errors in the log file. Table 4 lists the failure conditions defined for this command and the error codes they return.

TABLE 4

File Set Position Error Codes

| Error Code | Data Connector Explanatory Text | Description |
|---|---|---|
| pmrcFailure | (See Appendix) E.) | A fallback data file could not be opened or ran out of space. The position data have the wrong length. An I/O error occurred while seeking in the fallback file, A signature check failed. The size of the Set Position data does not match what the module expects. The module returns a descriptive message in the command's Opts.ErrMsg.Data field. |
| pmrcDataFormatErr | Unexpected data format | On attempting to recover the writer-side, the user specifies signature checking but the recovered fallback file does not contain a signature. The signature of the pipe data fails to compare during writer-side recovery. |
| pmrcBadChkPtMode | Invalid Check-pointing method | The position data does not match a value returned by a previous File Get Position. The module reaches a premature end-of-file, reading from the pipe during writer-side recovery. |

Access Module Shutdown

When this command succeeds, it returns pmrcOK. The module cleans up any leftover resources when:

In WIN32 MFC's DllMain( ) on DLL_PROCESS_DETACH is called.

In UNIX when the global module's destructor is called.

Access Module Identification

This command causes the module to return its module name and version to the application.

This command returns pmrcOK.

Get Access Module Attribute

The access module rejects this command with error code pmrcBadAttrName since it implements no meaningful module attribute. The corresponding Data Connector log message is "Unrecognized attribute name". The module also writes message number 33 to the error log.

File Get Attribute

The access module rejects this command with error code pmrcBadAttrName since it implements no meaningful file attribute. The corresponding Data Connector log message is "Unrecognized attribute name". The module also writes message number 33 to the error log.

Put Access Module Attribute

The access module rejects this command with error code pmrcBadAttrName since it implements no meaningful module attribute. The corresponding Data Connector log message is "Unrecognized attribute name". The module also writes message number 33 to the error log.

The FASTLOAD, MULTILOAD, and TPUMP utilities routinely issue this command, attempting to set the "character set" attribute, which some access modules implement. Thus the appearance of message number 33 in the access module log file can occur when working with these utilities.

Put File Attribute

The access module rejects this command with error code pmrcBadAttrName since it implements no meaningful file attribute. The corresponding Data Connector log message is "Unrecognized attribute name". The module also writes message number 33 to the error log.

Initialization String Parameters from the Data Connector

The initialization parameters are passed as a string during the Access Module Initialization command. The initialization string is effectively a list of keyword/value pairs. Within the Named Pipes Access Modules, this string takes the format <keyword><whitespace> . . . [= . . . ][<whitespace> . . . ] <value> . . .

or alternately,

<keyword>[<whitespace> . . . ]= . . . [<whitespace> . . . ] <value> . . .

where <keyword> is an identifier and <value> is either an integer or a string possibly enclosed in a pair of either single or double quotes.

Keywords may be any combination of uppercase or lowercase letters. Allowable keywords are described below.

The <keyword> and <value> should be separated by any combination of whitespace and/or equal ('=') signs. Note that the equal sign is optional.

Values can be a mix of uppercase or lowercase letters unless the value specifies a UNIX filename or path.

Utilities such as FASTLOAD expect the user to quote the access module initialization string when it appears in a script. Therefore, to quote a <value> string in the initialization string, the user surrounds the <value> string with pairs of quotes. FASTLOAD recognizes the pairs as embedded quotes and passes them correctly to the access module.

Multiple parameters are separated by whitespace.

The Data Connector can support an initialization string length of 512 characters. FASTLOAD currently restricts the string to 255 characters. For this reason, the module can offer both long and short forms of its keywords.

The access module applies each parameter as it is parsed.

Block Size

This parameter has the format

Block_size=nnnn or the short form b=nnnn where nnnn is an integer from 1 to 2147483647 (INT_MAX), specifying the number of bytes which the module attempts to return to the Data Connector in the BufferLen field of a pmi_RW_t structure in a single File Read operation. The buffer size is limited by the amount of free memory in the system. The default is 65536 bytes.

Log Information

The module optionally appends messages to a log file named namedpipes.log. The log file directory is taken from the environment variable NPLOGDIR in both UNIX and WIN32 environments. The user can alternately specify the directory in the initialization string. The module opens the log file only when an instance of the data access module needs to make an entry. If the log file cannot be opened then data to be logged is lost.

Log Directory

The user specifies the log directory in the environment variable NPLOGDIR. If NPLOGDIR is undefined, the user can specify a log directory in the initialization string, using the log_directory keyword. Defining the log directory by an environment variable allows the module to log errors that occur before the access module initialization string is received. If neither NPLOGDIR nor log_directory is defined, the default directory for the log file is determined as shown in Table 5.

TABLE 5

Log Directory Defaults

| Environment | Default Directories |
|---|---|
| UNIX | /tmp |
| WIN32 | %TEMP% then C: \ |

The format of the initialization parameter is log_directory directorypath or the short form ld=directorypath where directorypath is the directory path. The directorypath value should be quoted if the path contains embedded spaces. Because the access module applies each parameter as it parses the initialization string, the user obtains the earliest log information by doing one of the following:

1) assigning the log directory in the NPLOGDIR environment variable, or 2) coding the log_directory parameter at the beginning of the initialization string.

Log Level

The log level is specified as log_level=n or the short form ll=n where n is an integer from 0 to 6. A value of 0 disables logging, whereas values from 1 to 6 produce increasingly more verbose logging and even debugging information at the highest levels. If NPLOGDIR is defined in the environment or if the log_directory option specifies a directory, the default level is 2, which logs errors or worse. If neither NPLOGDIR is defined in the environment nor the log_directory option is specified then the default level is 0 (disabled), which can be overridden by the log_level keyword. The log levels for this embodiment have the meanings shown in Table 6.

TABLE 6

Log Level Values

| Level | Meaning |
|---|---|
| 0 | Disabled. The default if no logging directory is defined. |
| 1 | Critical. The module cannot obtain a critical resource such as memory or its message strings. |
| 2 | Error. The default if any logging directory is defined. |
| 3 | Warning. A suspicious situation has arisen, but processing continues. |
| 4 | Information. The module reports an interesting event or statistic. |
| 5 | Debug. Details normally used during debugging. |
| 6 | Trace. Verbose info about every I/O. |

The messages for levels 0 through 4 are localized. Log messages at levels 5 and 6 are always in English. Higher levels produce more messages.

Fallback Data Filename

When unnamed pipes are used on UNIX, the module asks the user to specify the name of a fallback data file. Since unnamed pipes do not persist across process lifetimes, the user should specify the name of the file to use both in the initial session and in a restarted session. The format is:

fallback_file=file_path or the short form ff=file_path where file_path is the filename path. The file_path value should be quoted if the path contains embedded spaces.

Under UNIX the user can specify file_path as /dev/null to suppress creation of a fallback file, for example, if checkpointing is not used. Since the module attempts to delete the fallback file on a successful operation, the user should not specify file_path as/dev/null when running as root.

Fallback Data Directory

When named pipes (as opposed to unnamed pipes) are used, the module can automatically generate the name of its fallback data file in a fallback data directory. The module hashes the path of the named pipe into a filename then creates the fallback data file. Since named pipe names are persistent, the path of corresponding named pipe is placed in the file as a consistency check in case of a complete restart. The format is:

fallback_directory=directory_path or the short form fd=directory_path

Where directory_path is the directory path. If no directory path is given then the module uses the a default shown in Table 7.

TABLE 7

Fallback Data Directory Defaults

| Environment | Default Directory |
|---|---|
| UNIX | /opt/np_axsmod |
| WIN32 | %TEMP% then %WINDIR% \temp |

Under WIN32% TEMP % is normally defined for each user during installation time, but if it has been deleted and is no longer defined then %WINDIR%\temp is used. If the directory does not exist, the module reports an error and logs it.

If both a fallback data file name and a fallback directory are specified, the fallback data file name takes precedence.

Confirm Deletion of Fallback Data File

When selected, this option prompts the user to confirm deletion of the fallback file after the module has indicated end-of-file to the Data Connector and the Data Connector has issued a File Close command. The user selects this option by including the assignment confirm_fallback_deletion=y or the short form cfd=y in the initialization string. The default is not to produce a dialog.

If the Data Connector issues a File Close command before the module reports end-of-file, the dialog does not occur and the fallback data file is not deleted.

Signature Checking

When a transfer has failed and the writer process has been completely restarted, signature checking verifies that the original data have been reliably reissued. This feature is useful when the data source possibly changes between the failing session and the new session. The option takes the form:

signature_check=l or the short form sc=l where l is the level. The level has the meanings shown in Table 8.

TABLE 8

Signature Check Levels

| Level | Meaning |
|---|---|
| 0 | A signature is neither calculated nor checked. |
| 1 | A signature is calculated and checked. A failing comparison logs an error but does not return an error to the reader. |
| 2 | A signature is calculated and checked. A failing comparison logs an error and returns an error to the reader. This is the default. |

Level 2 is the default since

The algorithm takes little processing overhead. Benchmarks on both WINDOWS NT 4.0 and UNIX show performance of greater than 10 MB per second.

This operation offers the greatest protection to the user.

The signature checking algorithm is MD5, derived from the RSA Data Security, Inc. MD5 Message-Digest Algorithm. This algorithm is optimized for 32-bit processors. The implementation is Aladdin Enterprises' version.

Log File

The modules provide a log file named namedpipes.log for recording information on the modules' status and activity. The log is organized as an ordinary text file, viewable by standard utilities in both UNIX and WIN32 environments. The log file directory and level of information logged are configurable.

Messages are logged at a level from 1 to 6. Messages at levels 1 through 4 in the log are internationalized. Messages at levels 5 and 6 are not internationalized because they are intended for viewing only by engineering personnel. Their text is hard-coded within the module itself.

In WIN32 the localized text comes from the resource file np_AXSMODenu.dll. However, the product is designed such that alternate resource files for other languages can be created with no modification to the main module np_AXSMOD.dll. The general form of the resource file name is np_AXSMODlanguageID.dll where languageID is a standard ISO abbreviation. Using the WIN32 GetLocaleInfo( ) function to obtain the languageID, the module searches for the resource file that contains localized text in the following order:

1. By using the abbreviated locale name, e.g. "frc" for Canadian French,
2. By using the primary language of the given abbreviated country name, e.g. "fra" for France.
3. By using the default locale, "enu" which specifies USA English.

In UNIX the localized text comes from the message file /usr/lib/locale/locale/LC_MESSAGES/np_axmod if installed, where locale is a standard UNIX locale. Otherwise, the localized text comes from hard-coded strings within np_axsmod.so itself. This text corresponds to the system default locale C. The product's source module set includes a file msgs.txt, which serves as the source for the hard-coded strings in np_axsmod.so. The msgs.txt file can be translated and compiled by country support organizations using the UNIX mkmsgs(1) command to create a message file.

Under UNIX the log file is created with a umask value of 0 if the default directory is used. This results in file permissions of 666 so that the log file can be shared among different users. If a directory is specified using the environment variable NPLOGDIR or the log_directory keyword, the module creates the log file using the process' umask.

Console Dialog in UNIX

When the user has chosen the confirm_fallback_deletion option and the module has indicated end-of-file to the Data Connector and the Data Connector has issued a File Close command, the module prompts the user to confirm deletion of the fallback file. It issues the following messages to the active terminal at /dev/tty:

"The transfer on <name of device> has completed.

The file <name of fallback data file> contains n.n megabytes of data that are no longer needed.

If you intend to re-start the transfer to recover data, do NOT delete this file.

Do you want to delete the file now? (y or n)"

The module then reads one line from the active terminal at /dev/tty. If the user enters y or yes then the system deletes the file and confirms to standard out with the message "The fallback data file has been deleted."

If the user enters any other response, the system responds with the message

"The fallback data file has not been deleted.

You can delete it later."

The dialog is localized using the techniques described above.

Dialogs in WIN32

If the WIN32 Named Pipes Access Module experiences a critical error, such as failure to allocate memory, it displays the error in a WINDOWS message box. It also logs the error to the log file.

The WIN32 Module also implements a counterpart to the confirm fallback deletion dialog, described above, using a WINDOWS dialog box. The dialog is localized.

Error Messages

The module returns to the Data Connector standard error codes that are defined in the Data Connector source file <pmdcomt.h>. The codes have mnemonics like pmrcOK. The Data Connector generates the error message text for all standard error codes except pmrcFailure, for which the module generates the error text. All pmrcFailure error messages are localized and logged. Unlike log messages, the text passed with the pmrcFailure does not have a message number.

WIN32 Named Pipes API

When creating a WIN32 client application that writes to a named pipe, one should know how the named pipes server creates the named pipe. This is important so that the developer codes the corresponding options on the client application's CreateFile( ) system call. The WIN32 Named Pipes Access Module creates the named pipe, using the following system call:

CreateNamedPipe(PipeName, // Pipe name
PIPE_ACCESS INBOUND, // Open mode
PIPE_TYPE_BYTE, // pipe mode
4, // Number of instances
BuffSize, // output buffer size
BuffSize, // input buffer size
100,// default timeout in milliseconds
NULL); // pointer to security attributes where, PipeName is any string of the form \\.\pipe\pipename and pipename is the pipe name agreed on between the client and server applications BuffSize is a value twice the number of bytes specified in the initialization string "Block_size" parameter.

A user-developed client application should code the GENERIC_WRITE (but not the GENERIC_READ) option on its CreateFile( ) system call since the access module allows data to flow only from client to server. For example, HANDLE hPipe=
CreateFile(PipeName,// pipe name
GENERIC_WRITE, // write access
0, // no sharing
NULL, // no security attributes
OPEN_EXISTING, // opens existing pipe
( ), // default attributes
NULL); // no template file Alternately, the client utility can use standard 'C' stream I/O, opening the pipe with FILE*fp=fopen(PipeName, "wb");

As a named pipes server, the access module can both connect to the pipe and read from the pipe using synchronous, blocking I/O. The client is free to write to the pipe either synchronously or asynchronously.

The access module does not impose a message structure on the data flowing through the pipe. Thus the client application may write to the named pipe either as a stream of bytes or as a stream of messages since the access module reads from the pipe as a stream of bytes.

For details on programming WIN32 named pipes, see the article "Named Pipes" under *Platform SDK* in the Microsoft Developer's Network On-Line Library, the entire disclosure of which is hereby incorporated herein by reference.

Data Decomposition

This section describes the data structures for this exemplary module.

Global Data Object: CAxsmod

This global data object can contain the following member data:

m_pGenMallocFailureException, a pointer to a prebuilt exception to throw in case of free memory exhaustion.

m_InstanceList, a list of Per-Instance Data Objects (see below).

m_ClientThreadId, the ID of the thread used to load this library (WIN32 only).

m_pPreviousNewHandler, a pointer to the previous "new" handler (UNIX only).

Per-Instance Data Object: CInstance

One per-instance object is created for each pmiPIDMOpInit request received from the client. It contains mostly values parsed from the initialization string. The CInstance object contains the following fields:

m_LogDir, a CStdString containing the log directory taken from the log_directory initialization string parameter.

m_LogLevel, an integer containing the log level, taken from the log_level initialization string parameter.

m_FBFileName, a CStdString containing the fallback file name, taken from the fallback_file initialization string parameter.

m_FBDir, a CStdString containing the fallback directory name, taken from the fallback_directory initialization string parameter.

m_ConfirmDelete, a Boolean taken from the confirm_fallback_deletion initialization string parameter.

m_DataVerify, an integer containing the signature check level, taken from the signature_check initialization string parameter.

m_BlkSize, an integer containing the block size, taken from the block_size initialization string parameter.

m_strClientID, a CStdString which saves the client ID (WIN32 only).

m_FileList, a list of per-file data objects.

Per-File Data Object: CFileData

This illustrative module dynamically creates and initializes a per-file data structure on receipt of each File Open command from the Data Connector. The per-file data structure contains per-file state information. The module frees the structure on receipt of the File Close command. Its member variables are:

m_state, an enumerated integer, specifying the general state of the pipe as one of the following:

1. NORMAL, during which the module reads data from the pipe
2. INIT_SYNC, indicating that the module found a fallback file left over from a previous transfer. The module is waiting for the Data Connector to issue a File Set Position command, which synchronizes the writer side of the pipe.
3. RECOVER_DATA, during which the module reads data from the fallback file.

m_ValidateNum, the 16-byte digital signature of the data read through the pipe during writer-side recovery.

m_ValidateState, the cumulative MD5 state of all data read through the pipe.

m_ValidateStateAtGetPos, a snapshot of m_ValidateState taken when a File Get Position is received. This value is updated when the module reads data from the fallback file.

m_FallbackName, a CStdString containing the fallback file name.

m_FileHdr, a copy of the fallback file's header. See below.

Standard String Object: CStdString

Internally the module uses a number of text strings instantiated from the class CStdString, which emulates Microsoft Foundation Class's CString class. The class CStdString derives from the C++ Standard Template Library string class std::basic_string.

Exception Class: CErrMsgException

Internally the module uses an exception class CerrMsgException derived from the STL class std::runtime_error. This class has two members:

m_MsgNum, an integer which carries the message number to be logged, and

_What, a CStdString, which carries a localized message.

These two members result in entries to the named-pipes.log file. The text is returned as an error message to the Data Connector.

Fallback Data File Format

The fallback data file contains the following three sections:

File header
Synchronization header
Any number data blocks.

These sections are described below.

Fallback File Header

The file header is written once, when the file is originally created. The module reads the file header during writer-side recovery to guarantee that the file is the one used during the original transfer. It contains the following fields:

MagicNum, the string "Named Pipes Data Access Module Fallback File vv.vv.vv\n", which serves as a magic number. The substring vv.vv.vv is the version number of the file format. The initial version number is 01.00.00. The version will be changed if the file format changes in later designs. On searching for a fallback file left from a previous session, the module compares for this string to check the file's integrity.

PipeName, the path of the corresponding named pipe. This allows the module to locate an automatically generated fallback file after the original process has exited. In UNIX the module attempts to store the absolute pathname of the pipe if a relative path was given.

ValidSignature, a Boolean value indicating whether the file's digital signature is valid. The original signature_check parameter determines this setting.

BlkSize, the value of the block_size parameter. The block size during recovery sessions should match the block size of the original session.

Synchronization Header

The Synchronization Header is read only during writer-side synchronization. The module writes the Synchronization Header in the following cases:

1. When it initially creates the fallback file.
2. When the Data Connector issues a File Get Position command and the module has not already updated the Synchronization Header.

The 12-byte synchronization header contains two synchronization point records, one for the last value returned on a File Get Position command and one for the next-to-last value returned on a File Get Position command if different from the last. Each synchronization point record contains the following fields:

BlockNumber, a 64-bit unsigned integer, starting with value 0, that specifies a block number from which the module can recover during writer-side recovery. The module returns the block number to the Data Connector on a File Get Position command. The Data Connector is expected to return this number in a File Set Position command. The module increments its internal copy of the block count after returning a block to the Data Connector. On initially creating the file, the module writes a value of 0xffffffffffffffff as the block number, indicating that the Data Connector has not yet issued a File Get Position command (and doesn't know the file position).

Signature, a digital signature of all previous data read through the named pipe, including the block corresponding to BlockNumber above. When synchronizing the data stream after both the reader and writer processes have terminated, the digital signature guarantees that the writer delivers the original byte stream through the pipe again. Because the MD5 algorithm is used, the digital signature is 16 bytes in length. If the initialization string does not specify signature checking, the module writes a value of all-zeroes to this field.

Fallback Data File Blocks

On executing a File Read command from the Data Connector, the module reads from the pipe until it accumulates a number of bytes equal to the block_size parameter. The module then returns the data to the Data Connector, saving a copy to write to the fallback file. Each block written to the fallback file contains pure data with no header.

A fallback data file contains any number of consecutive blocks. The first block following the Synchronization Header corresponds to the highest block number in the Synchronization Header. All other blocks follow in order.

Log File Format

The log file format consists of numbered, text messages of format:

time-stamp process level message-number text . . .

where the fields are described in Table 9.

TABLE 9

Log File Fields

| Field | Description |
| --- | --- |
| time-stamp | locale-specific date and time stamp, e.g. Thu Jan 27 16:33:57 2000 |
| process | The logging task's process ID as a decimal. |
| level | One of the following localized words, indicating the logging level: CRITICAL, ERROR, WARNING, INFO, DEBUG, TRACE |
| message-number | Decimal message number associated with following text. |
| text . . . | Descriptive text. |

The module displays the name of the process in the "Log Initialize" message. The process number corresponding to this process name appears as the process field on this and every subsequent message from the same process.

The "Log Initialize" message also contains the Utility ID, an arbitrary string by which the utility identifies itself. If the user assigns the NPLOGDIR keyword, the module initializes the log before it receives the Utility ID. In this case the module displays "(unknown)" instead of the Utility ID.

The time-stamp and descriptive text are internationalized.

A level appears with each message, indicating the relative importance of that message. Setting the log level can screen the messages that appear in the log. Messages at levels 1-4 are internationalized.

A message number appears with each entry, facilitating support across natural languages. Debug and trace messages are not internationalized. They appear with a message number of 9999 because they are intended for viewing by engineering personnel.

Each line is terminated with CR/LF under WIN32 and NL under UNIX.

Component Decomposition

This section describes the components of various exemplary embodiments of Named Pipes Access Modules. The embodiments can use common code between platforms where feasible.

UNIX Named Pipes Access Module Components

The UNIX Named Pipes Access Module embodiment is composed of the following:
- np_axsmod.so, the shared library which contains the access module logic. This library is installed under /usr/lib.
- np_axsmod, (for non-English locales) the message catalog containing text for log messages and the user dialog. In non-English locales the message catalog can be released under /usr/lib/locale/<locale>/LC_MESSAGES. This file need not be released in the English-language version of the module since the default strings embedded within np_axsmod.so are already in English. The module is designed to use message catalogs if present.

MP-RAS Build Environment Differences

Though the MP-RAS Standard 'C' Development Environment (SCDE) package offers C++, the version it offers does not comply with the latest standards. Because SCDE lacks a C++ Standard Template Library, the MP-RAS version of the module should be compiled and linked with a third-party product, the ObjectSpace C++ Component Series. This product provides the missing STL functions and header files utilized to build the module.

SOLARIS Build Environment Differences

Most of the standard classes from which are derived CStdString and CErrMsgException are available in the C++ library on SOLARIS; thus no third-party product is required to be linked with np_axsmod.so. Instead, the corresponding standard header files are included like "string" and "exception". Iostream is used while compiling/linking. Other C++ features such as, "arraynew", "bool", "namespace" are included during compilation.

WIN32 Named Pipes Access Module Components

The WIN32 Named Pipes Access Module embodiment is composed of the following:
- np_AXSMOD.dll, the dynamic link library which contains the access module logic
- np_AXSMODenu.dll, the strings DLL, containing text for log messages and the user dialogs. This DLL is released in all versions of the product. Both libraries are installed under %systemroot%\system32, consistent with TUF 6.1 goals.

Microsoft Visual Studio 6.0 can be used to build the WIN32 version of the module. This product offers a modern, standard C++ development environment and requires no third-party product.

Packaging

The Named Pipes Access Modules can be included on the install media with TUF 6.1 products.

Installation

Some of the installation features can be similar across the operating systems, and others can be different. The similar features can include:
- The files to be installed are in a known location to be included on the TUF install media.
- Silent install is supported and a file is used to answer setup questions for a silent install.
- The products are able to be uninstalled.
- There is a default location to install the program, but the user can change it.
- The installation screen and messages are consistent with TUF 6.1 programs.
- The permissions of the files and who can use them need to be set.
- This product contains its own license agreement.
- Configuration information is contained in a common location.

Packaging and Installation on WINDOWS Based System

For the WIN32 embodiment, the installation can be done using the WINDOWS Install Shield and is able to run the install interactively or silently. The file used by silent install to provide installation and configuration information is named namedpipes.iss. This is a text file that can be edited by any text editor such as Notepad. Because multiple TUF products can use this product, it can be installed as SHARE. This will cause a question about removal of the shared file during uninstall.

Updates can be done without having to reinstall.

The installation of the package is internationalized. This means interactive queries can be localized to the native language. This is done using a separate DLL.

The installation is able to restrict who can access and execute the program. The default is everyone. The program is a set of DLLs and the default directory to install the DLL is %SystemRoot%\system32.

The user has the option to change this during installation. There are two DLLs. One is for the basic program and is named np_AXSMOD.dll. The other is to provide localization information and is named np_AXSMODenu.dll.

Packaging and Installation on UNIX Based Systems

For the UNIX products the installation follows the Package Update Extensions (PUP-E) standard. The PUP-E standard makes use of the UNIX SVR4 standard for software packaging, which includes the commands such as pkginfo, pkgadd, pkgrm, etc.

Information about PUPE and the UNIX software packaging standard can be found on the MP-RAS installation media and can also be found on MP-RAS systems in html format under the directory /usr/update.proto/docs/html This program does not require delayed update. The package name is npaxsmod and the description is "Named Pipes Access Module."

The installation does not ask the user any question during installation.

A shared library program provides the Named Pipes Access Module functionality for the TUF programs. The shared library is placed in the /usr/lib directory. The name of the shared library is np_axsmod.so.

Management of Fallback Data File

This section describes how the illustrative modules maintain the fallback data file. The format of the fallback data file is discussed above.

General Concepts

The module maintains the fallback data file as a standard flat file. Each open pipe corresponds to a separate fallback data file.

Creation and Opening

On receiving the Data Connector's File Open command, the module attempts to open an existing fallback data file using from one of the three following techniques:

If the initialization string contained a fallback_file keyword, the module uses that name.

Otherwise, if the initialization string contained a fallback_directory keyword, the module maps the filename given on the File Open command into a fallback file name.

If neither a fallback_file keyword nor a fallback_directory keyword was specified, the module selects a default directory (see "Fallback Data Directory") and maps the filename given on the File Open command into a fallback file name.

If a fallback data file does not exist, the module creates a fallback data file with only a file header and a sync header. This scenario occurs in a fresh, nonrecovery session.

If a fallback data file does not exist and the Data Connector next issues a File Set Position command, the module fails the attempt. This scenario occurs if the fallback data file has been deleted following a failing session.

If a fallback data file exists and the Data Connector next issues a File Set Position command, the module verifies the position requested per the sync header data. If the position is valid, the module assumes that the user is attempting recovery and has restarted the writer process. The module reads data from the pipe, computing the message signature, discarding the writer's data until the block number saved in the fallback file's Sync Header has been reached. If the signature checking is enabled and the signature check fails when the position has been reached, the module fails the command. If the signature compares (or the signature-checking option has not been selected) the module begins reading from the pipe and caching data in the fallback data file.

If the fallback data file exists and the Data Connector next issues a File Read command, the module reuses the file, overwriting any previous data. This scenario occurs if the fallback data file has been left over from a previous session and the current session does not use fallback.

How Fallback File Names are Automatically Generated

When the module automatically generates a fallback filename, it can follow this template:

ppppppphhhhuuuu.fbf

Where ppppppp is the simple filename of the pipe hhhh is a hex value hashed from the full path name of the corresponding pipe name uuuu is a hex sequence number used to force a unique name within the given directory The string pppppp is the simple filename of the pipe, variable in length. The value hhhh is generated by calculating the modulo 65536 sum of the full path name of the corresponding pipe name formatting the sum as four hexadecimal digits The value uuuu is a four-digit hex sequence number used to incrementally force a unique name if the name ppppppphhhh0000.bf already exists within the given directory. This scheme fails if 65536 files with the same initial string ppppppphhhh already exist in the fallback directory.

The suffix ".fbf" is an abbreviation of "fallback file".

In searching for an existing fallback file with an automatically generated name, the module can perform the following:

1) enumerate the fallback file directory,
2) search for a match within the ppppppphhhh portion of the name, and
3) on finding a filename match, compare for the full path of the corresponding pipe within the header of the candidate fallback file.

Writing Fallback Data

The module buffers the last block read from the pipe in its block buffer so that it can always return to the Data Connector the last block read before last File Get Position command. On receipt of a File Read command, the module does the following:

1) writes the last block read from the pipe, saved in the block buffer, to the fallback file,
2) reads a block from the pipe device, accumulating block_size bytes,
3) saves the block in the block buffer, and
4) returns the data block to the Data Connector.

The first File Read Command after a File Get Position command causes the module to write the block saved in the block buffer to the position immediately following the Sync Header. This indicates to the module that the reader has saved all blocks before the last block read and that earlier data, cached in the fallback data file, can be safely overwritten.

Out of Space Conditions

If, while writing to the fallback data file, the module detects an error, such as an out of space condition, the module does the following:

1) deletes the fallback file, potentially freeing up space, 2) sets an internal state, indicating that no fallback file is present, 3) makes an entry in the log (if possible), and 4) continues passing data from the pipe stream to the reader process.

If the reader attempts to back up (i.e. set file position) to a previous position, the module fails the request.

If the reader issues a File Get Position command, the module clears the state mentioned in point b) and attempts to create and write to the fallback data file again.

Reading Fallback Data

On receipt of a File Set Position command, the module resets its read file pointer to the first data block past the Sync Header. This corresponds to the last block delivered to the Data Connector before the last File Get Position command. From this point on, successive File Read commands deliver data from the fallback data file rather than from the pipe.

When the module detects that it has delivered data from the last block cached in the fallback data file, it resumes:

1) reading from the pipe, 2) writing a copy of the pipe data as data blocks to the fallback data file, and 3) returning pipe data to the Data Connector.

Deleting the Fallback Data File

The module can delete the fallback data file in the following circumstances:

It detects an end of file on reading from the pipe, returns the pmrcEOF status, the Data Connector issues File Close and either the confirm_fallback_deletion option was not active or the user specified that the file should be deleted in the ensuing dialog.

It encounters an error in writing to the file.

Capacity Planning for the Fallback Data File

The user can locate the fallback data file on a file system that can hold the largest possible fallback file. The fallback data file grows to contain the most data the application sends between any two checkpoints.

For example, the user can direct FASTLOAD to checkpoint after a specified number of rows, using the CHECKPOINT clause of the BEGIN LOADING statement. Hence the number of rows between checkpoints times the maximum row size can be used to approximate the largest fallback data file size required. Checkpoints can be taken:

every 50,000 records if each record is more than 4 Kb every 100,000 records if each record is less than 4 Kb.

After multiplication, these guidelines imply that fallback data file sizes can range from about 200 Mb to about 400 Mb in size. For a large database, a fallback data file greater than about 1 Gb may be utilized.

When the log level is set to at least 4 (Information), the module logs the size that the fallback data file reaches before the module deletes the fallback data file.

Accordingly, this exemplary embodiment of the invention allows the data in the fallback file to be recovered in the event of certain errors and for the transfer over the pipe to continue at the point it had left off previously, without having to re-start the transfer from the beginning. In the event the transfer must be re-started from the beginning, the amount of data already transferred need not be operated on by the second process, thereby achieving increased efficiency. Moreover, a signature can be accumulated for this data and compared to the original signature accumulated during the first transfer. The two signatures can be compared to ensure that the data is valid and not corrupted or otherwise modified.

The foregoing descriptions of the exemplary embodiments of the invention have been presented for purposes of illustration and description only and should not be regarded as restrictive or limiting. They are not intended to be exhaustive or to limit the invention to the precise forms disclosed, and modifications and variations are possible and contemplated in light of the above teachings. While a number of exemplary and alternate embodiments, methods, systems, configurations, and potential applications have been described, it should be understood that many variations and alternatives could be utilized without departing from the scope of the invention. For example, non-critical errors that do not affect data transfer to the target (e.g. errors in the fallback file at a time when the file is not needed for a recovery) need not be reported by the access module or affect the data transfer to the target. Moreover, although a variety of potential software and hardware components have been described, it should be understood that a number of other components could be utilized without departing from the scope of the invention. In addition, while various aspects of the invention have been described, these aspects need not be utilized in combination.

Thus, it should be understood that the embodiments and examples have been chosen and described only to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A computerized method for protecting data transferred using a volatile data transfer mechanism and for restarting the transfer process after a failure, the method comprising:

transmitting data using a volatile data transfer mechanism from a sending process to a receiving process;

accessing the data being transferred via the volatile data transfer mechanism;

saving the accessed data into a fallback file;

in response to an error condition, transmitting data from the fallback file to the receiving process and resuming transmission of data from the sending process to the receiving process using the volatile data transfer mechanism;

periodically issuing checkpoint signals; and in response to the checkpoint signals, saving the accessed data into the fallback file over previously accessed and saved data.

2. The method as recited in claim 1, wherein the sending process comprises a data writing process and the receiving process comprises a data loading process, and wherein the volatile data transfer mechanism comprises a pipe.

3. A computerized method for protecting data transferred to a target database using a pipe and for restarting the transfer process after a failure, the method comprising:

using a data writing process to write data from a source database;

transferring data over a pipe from the data writing process to a data loading process, wherein the data is transmitted in blocks;

providing a checkpoint signal after a predetermined point in the transferring of data to the data loading process;

using the data loading process to load the transferred data into a target database;

accessing the data being transferred via the data pipe;

saving the accessed data into a fallback file which is sized smaller than the source database, wherein the accessed data is saved over previous data in the fallback file after a checkpoint signal is provided;

in response to an error condition, providing a restart command; and in response to the restart command, transmitting data from the fallback file to the data loading process and resuming transmission of data from the data writing process to the data loading process using the pipe at approximately the position that the data writing process had left off.

4. The method as recited in claim 3, further comprising: counting the number of blocks transmitted via the pipe.

5. The method as recited in claim 3, further comprising: accumulating a signature of the data transferred via the pipe.

6. A computer system for transferring data from a source database to a target database:
- a source database;
- a writing process configured to extract data from the source database;
- a loading process configured to load data from the writing process to a target database;
- a pipe configured to transfer data from the writing process to the loading process;
- a fallback data file; and
- an access module configured to access data from the pipe and save information to the fallback data file for use in data recovery in the event of an error condition; and
- wherein the loading process is configured to periodically provide a checkpoint command.

7. The system as recited in claim 6, wherein the target database comprises a data warehouse database.

8. The system as recited in claim 6, wherein the pipe comprises a named pipe.

9. The system as recited in claim 6, wherein the access module is configured to save over data in the fallback file in response to a checkpoint command from the loading process.

10. The system as recited in claim 6, wherein the loading process is configured to issue a restart command in response to an error condition.

11. The system as recited in claim 10, wherein the access module is configured to transmit data from the fallback file to the loading process in response to the restart command.

12. The system as recited in claim 10, wherein the system is configured to restart transmission of data over the pipe after a restart command is provided.

13. The system as recited in claim 10, wherein the access module is configured to validate data re-transmitted over the pipe with data in the target database in response to a restart command.

14. A computer system for transferring data from a source database to a target database;
- a source database;
- a writing process configured to extract data from the source database;
- a loading process configured to load data from the writing process to a target database;
- a pipe configured to transfer data from the writing process to the loading process;
- a fallback data file; and
- an access module configured to access data from the pipe and save information to the fallback data file for use in data recovery in the event of an error condition; and
- wherein the loading process is configured to issue a restart command in response to an error condition;
- wherein the access module is configured to validate data re-transmitted over the pipe with data in the target database in response to a restart command; and
- wherein the access module is configured to conduct the validation using a signature algorithm.

15. A method of validating data re-transmitted after a data transmission error using a volatile data transfer mechanism, the method comprising:
- transmitting data via a volatile data transfer mechanism;
- accumulating a signature of the data transmitted;
- in response to an error condition, re-transmitting data via the volatile data transfer mechanism;
- accumulating a validation signature of the retransmitted data;
- comparing the two signatures; and
- if the signatures do not match, providing an error signal.

16. The method as recited in claim 15, wherein the signatures comprise MD5 signatures.

17. The method as recited in claim 15, further comprising:
- loading the data from the volatile data transfer mechanism to a target database;
- saving a count of the amount of data transmitted; and
- in response to the error condition, discontinuing the loading of re-transmitted data to the target database until the amount of re-transmitted data is approximately equal to the count and then resuming loading of data to the target database.

18. The method as recited in claim 15, wherein the volatile data transfer mechanism comprises a pipe.

* * * * *